(12) United States Patent
Ueno

(10) Patent No.: US 7,080,215 B2
(45) Date of Patent: Jul. 18, 2006

(54) MULTIPROCESSOR SYSTEM WITH LOCAL MEMORY WHICH MIRRORS A SHAPED MEMORY

(75) Inventor: Tomoyuki Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 10/278,123

(22) Filed: Oct. 22, 2002

(65) Prior Publication Data

US 2003/0204682 A1    Oct. 30, 2003

(30) Foreign Application Priority Data

Apr. 26, 2002 (JP) .............................. 2002-126212

(51) Int. Cl.
*G06F 12/00* (2006.01)

(52) U.S. Cl. ...................................... 711/147; 711/141

(58) Field of Classification Search ................ 711/133, 711/141, 142, 147; 710/36, 107; 345/541, 345/557
See application file for complete search history.

(56) References Cited

U.S. PATENT DOCUMENTS

| 5,353,428 A | * | 10/1994 | Shibata ........................ 711/145 |
| 5,615,334 A | * | 3/1997 | Wang et al. ................... 714/48 |

FOREIGN PATENT DOCUMENTS

| JP | 60-183652 | 9/1985 |
| JP | 01-297759 | 11/1989 |
| JP | 06-208547 | 7/1994 |
| JP | 8-30510 | 2/1996 |
| JP | 09-044399 | 2/1997 |

OTHER PUBLICATIONS

Notice of Rejection dated Feb. 10, 2006.

* cited by examiner

*Primary Examiner*—Pierre M. Vital
(74) *Attorney, Agent, or Firm*—Katten Muchin Rosenman LLP

(57) ABSTRACT

The present invention provides a multiprocessor which can decrease a required waiting time of access to improve the processing time thereof. There is provided a multiprocessor apparatus having a plurality of processor units in which each of processor units is arranged to include a processor, a local memory unit utilized for storing therein a copy of the whole data of a shared memory, and a copy circuit for controlling the local memory unit in the update processing when the contents of the shared memory are updated by the processor unit, wherein when the processor requests a piece of data that shall be stored in the shared memory with a data reading command, then the local memory unit reads the corresponding piece of data from the copied data stored therein and supplies it to the processor. The apparatus is applicable to a multiprocessing of a real time system, for example.

14 Claims, 13 Drawing Sheets

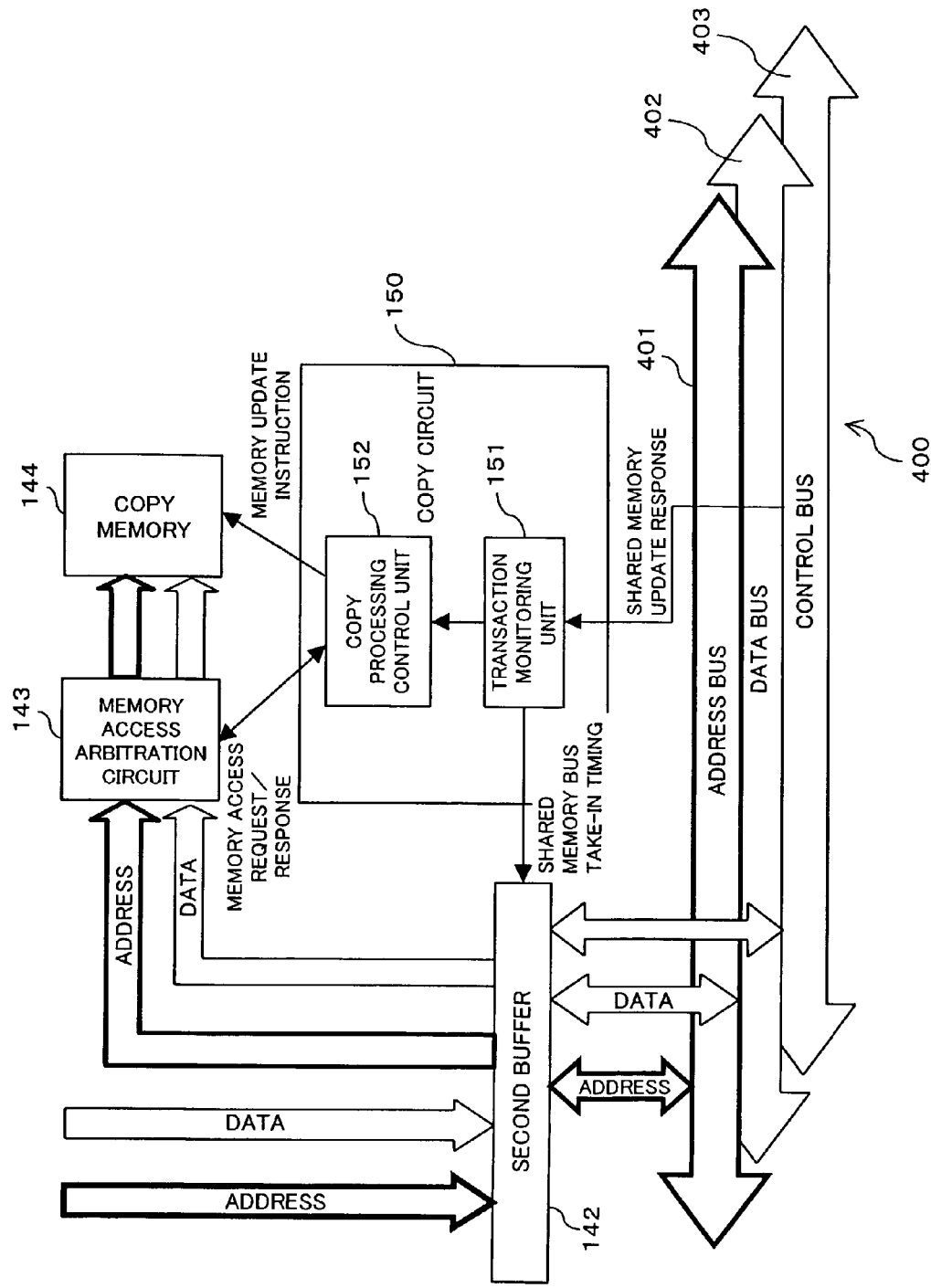

MULTIPROCESSOR SYSTEM WITH LOCAL MEMORY WHICH MIRRORS A SHAPED MEMORY

BACKGROUND OF THE INVENTION

1) Field of the Invention

The present invention relates to a multiprocessor apparatus suitable for use in a multiprocessor processing of a real time system, for example.

2) Description of the Related Art

The multiprocessor apparatus is an apparatus composed of a plurality of processors in which memory resources or the like are shared among each of the processors by using a shared bus. In this multiprocessor apparatus, jobs imposed on the multiprocessor apparatus are properly divided and assigned to each of the processors so that the job processing performance as a whole apparatus can be improved. Moreover, in this multiprocessor apparatus, components constituting the apparatus other than the processors can be shared by the processors. Thus, cost for manufacturing the apparatus can be suppressed to a relatively low level as compared with a case where a plurality of systems are prepared.

FIG. 13 is a block diagram showing a multiprocessor apparatus. As shown in FIG. 13, a multiprocessor 700 is arranged to include three processor units 100, 200 and 300, a bus arbitration circuit 500, and a shared memory 600 interconnected to one another by way of a shared memory bus 400.

The processor unit 100 is composed of a processor 110, a cache memory 120 and a snoop circuit 130. The processor unit 200 is composed of a processor 210, a cache memory 220 and a snoop circuit 230. And the processor unit 300 is composed of a processor 310, a cache memory 320 and a snoop circuit 330.

The cache memories 120, 220, 320 of the respective processor units 100, 200, 300 are each unit for storing therein a copy of partial data of the shared memory 600. Each of the snoop circuits 130, 230, 330 is a unit for monitoring the transaction on the shared memory bus 400 and controlling the invalidating processing on the same data when data stored in the cache memories 120, 220, 320 are updated.

The bus arbitration circuit 500 is a unit for effecting arbitration on the right to use the shared memory bus requested by the respective processors 110, 210, 310. The shared memory 600 is a memory commonly utilized by the respective processors 110, 210, 310 when any job is processed by the respective processors 110, 210, 310.

In the multiprocessor apparatus having the above-described construction, the cache memories 120, 220, 320 operable at a high speed for storing therein a partial copy of data stored in the shared memory 600 are disposed between the respective processors 110, 210, 310 and the shared memory bus 400. Therefore, almost all accesses to the shared memory 600 can be replaced with accesses to the cache memories, with the result that a direct access to the shared memory 600 requiring a lot of access time can be decreased in frequency. Accordingly, it becomes possible to suppress the lowering in the processor processing speed as compared with a case where the cache memories 120, 220, 320 are not provided.

Each of the snoop circuits 130, 230, 330 is a circuit for carrying out an invalidating processing on the cache memories 120, 220, 320 so that data matching property between the data stored in the shared memory 600 and the data stored in the cache memories 120, 220, 320 can be ensured.

In more concretely, each of the snoop circuits 130, 230, 330 of the respective processor units 100, 200, 300 always monitors the shared memory bus 400, and if the data in the shared memory 600 undergo any rewriting operation to make the data into a new version by any processor of other processor unit, each of the snoop circuits 130, 230, 330 examines whether or not any data of former version before the rewriting operation is left in the cache memory of its own processor unit. If it is determined that any data of former version is left in the cache memory, the subject data is made invalid. If the subject data is requested, it is determined that no data exists in the cache memory and the shared memory 600 is accessed to obtain data of the new version after the rewriting operation. In this way, the data matching property can be maintained between the shared memory 600 and the cache memories 120, 220, 320.

Japanese Patent laid-open gazette No. HEI 8-30510 discloses a technology in which snoop is carried out collectively by an external circuit, the invalidating operation is effected on only a cache memory having any data of former version before rewriting operation stored therein, whereby other processor requiring no invalidating processing is left allowed to access the cache memory in a normal manner. In this technology, a time period in which the processor ought to halt its operation is decreased.

Meanwhile, the cache memories 120, 220, 320 of the aforesaid multiprocessor apparatus 700 shown in FIG. 13 are arranged to store therein a partial copy of the contents of the shared memory 600. Therefore, all accesses to the shared memory 600 cannot be replaced with accesses to the cache memories 120, 220, 320. Accordingly, if data requested by the processors 110, 210, 310 are not prepared in the cache memories 120, 220, 320, the requested data shall be read from the shared memory 600 by way of the shared memory bus 400. This operation causes increase in frequency of direct access to the shared memory 600 which inevitably leads to a slow access speed.

For this reason, a countermeasure is taken in such a manner that data of consecutive several bytes, which are selected based on a prediction on the processor operation, are copied in advance in the cache memories 120, 220, 320 so that improvement can be achieved in a replacing ratio (hereinafter referred to as a cache hit ratio), i.e., ratio of replaceable accesses to the cache memories to the all data accesses to the shared memory. Thus, the processing speed of the processor can be suppressed from being lowered.

For example, Japanese Patent laid-open gazette No. SHO 60-183652 discloses a technology in which, in addition to an ordinary cache memory (dynamic cache), a static cache memory (static cache) is prepared so that data expected to undergo frequent accesses are fixedly assigned to the cache memory by using a special command, whereby the cache memories are managed depending on the data use frequency. In this technology, the cache hit ratio can be secured and the processing speed of the processor can be suppressed from being lowered.

However, if the multiprocessor apparatus shown in FIG. 13 is particularly obliged to do a real time system processor processing, many tasks each having a small size are processed at a time in a parallel fashion, and hence processing shall be carried out depending on occurring events. Therefore, it is almost impossible to predict a task which will be started up at the next step. In this situation, the processors 110, 210, 310 tend to make a lot of accesses to various kinds of discontinuing data, with the result that the processors tend to fail in finding a requested piece of data in the cache memories 120, 220, 320. Accordingly, the processors are forced to access the shared memory 600 for the requested piece of data.

If each of the processors 110, 210, 310 comes to make a frequent access to the shared memory 600, as described above, collision of bus use rights is frequently brought about in the shared memory bus 400, which fact leads to an overhead time due to the collision, with the result that access waiting time for the shared memory 600 tends to increase. This increased access waiting time will cause a difficulty if it is an essential target to decrease the processor processing speed.

Furthermore, in the technology disclosed in Japanese Patent laid-open gazette No. SHO 60-183652, if the data fixedly assigned to the cache memory is one that is frequently updated by other processors, invalidating processing is also frequently brought about on the subject data. Therefore, the cache hit ratio will be lowered, and transaction on the shared memory bus will be increased in order for reading the data after the updating. If transaction on the shared memory bus is increased, the access waiting time for the shared memory will also be increased correspondingly.

On the other hand, in the technology disclosed in Japanese Patent laid-open gazette No. HEI 8-30510, although the processor requiring no snoop can access the cache memory in an ordinary manner, the processor cannot cope with a problem of lowering in the cache hit ratio. Thus, transaction on the shared memory bus for reading data will also be increased.

SUMMARY OF THE INVENTION

The present invention is made in view of the above aspect. Therefore, it is an object of the present invention to provide a multiprocessor apparatus which can shorten a time for controlling the conflict over a shared memory use right, decrease a time for waiting for the availability of right of access to necessary data, and increase the processing time.

According to the present invention, in order to attain the above object, there is provided a multiprocessor apparatus having a plurality of processor units capable of executing an application processing independently, a shared memory for storing therein data commonly utilized by each processor unit upon executing the application processing, and a bus for interconnecting the plurality of processor units and the shared memory, each processor unit comprising a processor for carrying out a command executing processing for the application processing, a local memory unit provided between the processor and the bus and utilized for storing therein a copy of the whole data of the shared memory, and a copy circuit for controlling the local memory unit so as to update the contents of the local memory unit when the contents of the shared memory are updated by any of the plurality of processor units, wherein when the processor requests a piece of data that shall be stored in the shared memory with a data reading command, then the local memory unit responds to the reading command to read the corresponding piece of data from the copied data stored in the local memory unit and supplies the piece of data to the processor.

In the above arrangement of the multiprocessor apparatus, the copy circuit may be arranged so that when the processor generates an update command to the shared memory for updating the data stored in the shared memory and the shared memory responds to the update command with an update completion response, then the copy circuit controls the update processing of the local memory unit in accordance with the update contents of the shared memory.

More preferably, in the above arrangement of the multiprocessor apparatus, the local memory unit provided in each processor unit may be arranged to include a copy memory having a region for storing therein a copy of the whole data of the shared memory, a first buffer for temporarily holding therein address information delivered from the processor for executing the reading command and the resulting read data, a second buffer for temporarily holding therein an address and data as a target of update request delivered from the processor to the shared memory, and contents of the shared memory updated by any processor of the plurality of processor units supplied through the bus, and a memory access arbitration circuit arranged to respond to the control of the copy circuit so as to effect arbitration on the reading access to the copy memory based on the reading command delivered from the processor and an update access for updating the contents of the copy memory in accordance with the contents held in the second buffer.

As described above, according to the arrangement of the multiprocessor apparatus of the present invention, the processor units include the processors, the local memory units, and the copy circuits, respectively. Therefore, the copy of the whole data stored in the shared memory are also stored in the copy memory which is governed under each of the processors. Accordingly, the transaction due to the read access can be prevented from being brought about on the shared memory bus, with the result that it becomes possible to suppress the conflict of the shared memory bus. In particular, even if the multiprocessor apparatus is placed under a real time processing environment, the data invalidating processing, read-retrying processing or the like can be prevented from being increased on the cache memory as in the case where the multiprocessor apparatus employs a cache memory system, with the result that access to the shared memory for obtaining necessary data can be carried out with a minimum waiting time.

In the above arrangement of the multiprocessor apparatus, the copy circuit may be arranged to include a transaction monitoring unit for monitoring the transaction effected through the bus and an update control unit for controlling the update processing effected on the local memory unit based on the monitoring result of the transaction monitoring unit.

In this case, the multiprocessor apparatus maybe arranged in such a manner that, during the monitoring of the transaction effected through the bus, if the transaction monitoring unit receives an update completion response indicating that the data is updated in the share memory in response to the update command deriving from the processor, then the update control unit controls the update processing of the local memory unit in accordance with the update contents of the shared memory.

More preferably, in the above arrangement of the multiprocessor apparatus, the local memory unit may be arranged to include a status memory having pieces of information recorded therein so that the pieces of information correspond to all the data pieces stored in the corresponding address regions of the copy memory, respectively, and each piece of information indicates whether the corresponding data piece is last updated one or not, and the first buffer may be arranged to include a status determining unit for determining the information recorded in the status memory when data corresponding to the address of the reading command from the processor is read from the copy memory, and a reading processing unit arranged to respond to the result of determination delivered from the status determining unit in such a manner that when it is determined that data held at the address corresponding to the reading command is updated one, the held data is supplied to the processor while when it is determined that data requested based on the reading command is one not updated yet, the data requested based on the reading command is read from the shared memory and supplied to the processor.

As described above, according to the arrangement of the multiprocessor apparatus of the present invention, the local memory unit in each of the processor units is provided with the status memory and the first buffer. Therefore, each of the processors can be supplied with data that is coincident with the requested one depending on whether the data last updated in the shared memory has been copied to the copy memory or not. Accordingly, it becomes possible to shorten the waiting time of access due to the bus conflict. Moreover, it becomes possible to obviate the initializing processing for making the whole data stored in the three copy memories coincident with one another.

In this case, the multiprocessor apparatus may be arranged so that, if the update access for updating the contents of the copy memory is not satisfactorily carried out in accordance with the contents held in the second buffer, then the status memory is made to have recorded information indicative of data absent status at the corresponding address region.

More preferably, the multiprocessor apparatus may be arranged so that, the shared memory includes a first shared memory unit and a second shared memory unit for storing therein data which is utilized when the plurality of processor units execute application processing in a real time manner, the first shared memory unit being utilized for storing therein data which is utilized at relatively high frequency and a second shared memory unit being utilized for storing therein data which is utilized at relatively low frequency, the bus includes a first bus for interconnecting the plurality of processor units and the first shared memory unit to each other and a second bus for interconnecting the plurality of processor units and the second shared memory unit to each other, a first bus arbitration circuit for effecting arbitration on the first bus utilized by the processor unit and a second bus utilization managing circuit for managing the second bus utilization by the processor unit are provided, the local memory unit of each processor unit includes a classifying unit for classifying data as targets of a reading command or an updating command from the processor into data pieces in accordance with the frequency at which each data piece is utilized, a first local memory unit for storing therein the copied data of the whole contents of the first shared memory unit, and a second local memory unit for storing therein the copied data of the whole contents of the second shared memory unit, the copy circuit is arranged to control the first local memory unit in the update processing when any of the plurality of processors updates the contents of the first shared memory unit, and when the processor requests a piece of data that shall be stored in the shared memory with a data reading command, then the local memory unit responds to the reading command to read the corresponding piece of data from the copied data stored in the local memory unit and supplies the piece of data to the processor.

As described above, according to the arrangement of the present invention, the shared memory is composed of the first shared memory unit and the second shared memory unit, and the bus is also composed of the first bus and the second bus. Further, the local memory unit of each processor unit is provided with the classifying unit. Therefore, the data commonly utilized in a real time fashion at relatively low frequency can be accessed by way of a bus which is separate from a bus utilized upon accessing the data commonly utilized in a real time fashion at relatively high frequency. In particular, when the data processing is carried out in a real time fashion, access waiting time due to bus conflict can be shortened.

According to another aspect of the present invention, there is provided a multiprocessor apparatus having a plurality of processor units capable of executing an application processing independently, and a bus for interconnecting the plurality of processor units to one another, each of the processor units including a processor for carrying out data reading, data writing and a command executing processing for the application processing, a local memory unit for storing therein data utilized by the processor for carrying out the application processing, and a copy circuit for controlling the local memory unit provided in its own processor unit so as to update the contents of the local memory unit if any other processor unit updates the contents of the local memory unit thereof.

More preferably, the multiprocessor apparatus may have an arrangement having a bus arbitration circuit for effecting arbitration on a bus use by the processors, wherein when the local memory unit receives a data update request from the processor, the local memory unit outputs a bus use request to the bus arbitration circuit, and when the copy circuit receives a bus use permission from the bus arbitration circuit, the copy circuit controls the local memory unit in the update processing in accordance with the contents of the data update request.

Further, the multiprocessor apparatus as set forth above may be arranged so that, the local memory unit provided in each processor unit includes a memory for storing therein data utilized by the processor for carrying out the application processing, a first buffer for temporarily holding therein address information utilized for executing the reading command delivered from the processor and resulting read data, a second buffer for temporarily holding therein data and corresponding address as a target of the data writing request delivered from the processor and the contents of the memory of the local memory unit updated by any processor of the plurality of processor units, and a memory access arbitration circuit arranged to respond to the control of the copy circuit so as to effect arbitration on the reading access to the memory based on the reading command delivered from the processor and a writing access for writing the contents held in the second buffer into the memory.

More preferably, the multiprocessor apparatus may be arranged to include a bus arbitration circuit for effecting arbitration on a bus use by the processors, wherein the copy circuit comprises a transaction monitoring unit for monitoring the transaction effected through the bus, an update control unit for controlling the update processing effected on the local memory unit based on the monitoring result of the transaction monitoring unit, and a transaction completion notifying unit for notifying the bus arbitration circuit of the transaction completion through the bus when the writing access by the update control unit is completed.

In this case, the multiprocessor apparatus may be arranged so that, when the local memory unit receives a data update request from the processor, the local memory unit outputs a bus use request to the bus arbitration circuit, and when the bus arbitration circuit generates a bus use permission in accordance with the result of monitoring by the transaction monitoring unit in the copy circuit on the bus transaction, the update control unit controls the local memory unit in the update processing in accordance with the contents of the data update request.

Further, the multiprocessor apparatus may be arranged so that the local memory unit includes a status memory having recorded information indicative of whether the stored data is updated one or not in correspondence with an address region of the memory where the update control is effected by the update control unit, and the first buffer includes a status determining unit for reading data corresponding to the address of the reading command delivered from the processor from the memory, temporarily holding the read data, and determining the information recorded in the status memory, and a reading command outputting unit arranged to respond to the result of determination delivered from the status determining unit in such a manner that when it is determined that data held at the address corresponding to the reading command is updated one, the data held is supplied to the processor while when it is determined that data requested based on the reading command is one not updated yet, then data reading processing is carried out on the local memory unit of other processor unit.

In this case, the multiprocessor apparatus may be arranged so that, if the writing access for writing the contents of the memory in accordance with the contents held in the second buffer is not satisfactorily carried out, then the status memory is made to have recorded information indicative of data absent status at the corresponding address region.

Furthermore, the multiprocessor apparatus may be arranged so that the bus includes a first bus and a second bus for transacting data which is utilized upon executing application processing in a real time manner, the first bus being utilized for transacting data which is utilized at relatively high frequency and a second bus being utilized for transacting data which is utilized at relatively low frequency, the bus arbitration circuit includes a first bus arbitration circuit for effecting arbitration on the first bus utilized by the processor unit and a second bus utilization managing circuit for effecting arbitration on the second bus utilization by the processor unit, the local memory unit of each processor unit includes a classifying unit for classifying data as a target of a reading command or an updating command delivered from the processor into data pieces in accordance with the frequency at which each data piece is utilized, a first local memory unit for storing therein the copied data of the whole contents of the first shared memory unit, and a second local memory unit for storing therein the copied data of the whole contents of the second shared memory unit, and the copy circuit is arranged to control the first local memory unit in the update processing when any of the plurality of processors updates the contents of the first shared memory unit.

Therefore, according to the above-described arrangement of the multiprocessor apparatus, the processor apparatus itself is arranged to include a plurality of processor units and these processor units are interconnected to one another through a plurality of buses, and each processor unit is arranged to include the local memory unit and the copy circuit. Therefore, data to be stored in the shared memory can be prepared in the local memory unit which is placed under the control of each processor. Accordingly, it becomes possible to obviate the transaction deriving from the read access on the bus, with the result that conflict of the bus can be suppressed to the minimum, and waiting time of access due to the bus conflict can be shortened. Moreover, according to the above-described arrangement of the multiprocessor apparatus, each local memory unit can be operated as a virtual shared memory. Therefore, although the multiprocessor apparatus of this arrangement has no shared memory, it can function equivalently to the multiprocessor apparatus equipped with the shared memory.

BRIEF DESCRIPTION OF THE DRAWINGS

FIG. 3 is a block diagram showing an arrangement including a copy circuit and neighboring components employed in the first embodiment of the present invention;

DESCRIPTION OF THE PREFERRED EMBODIMENTS

Embodiments of the present invention will be hereinafter described with reference to attached drawings.

[A] Description of First Embodiment

Figure 1:
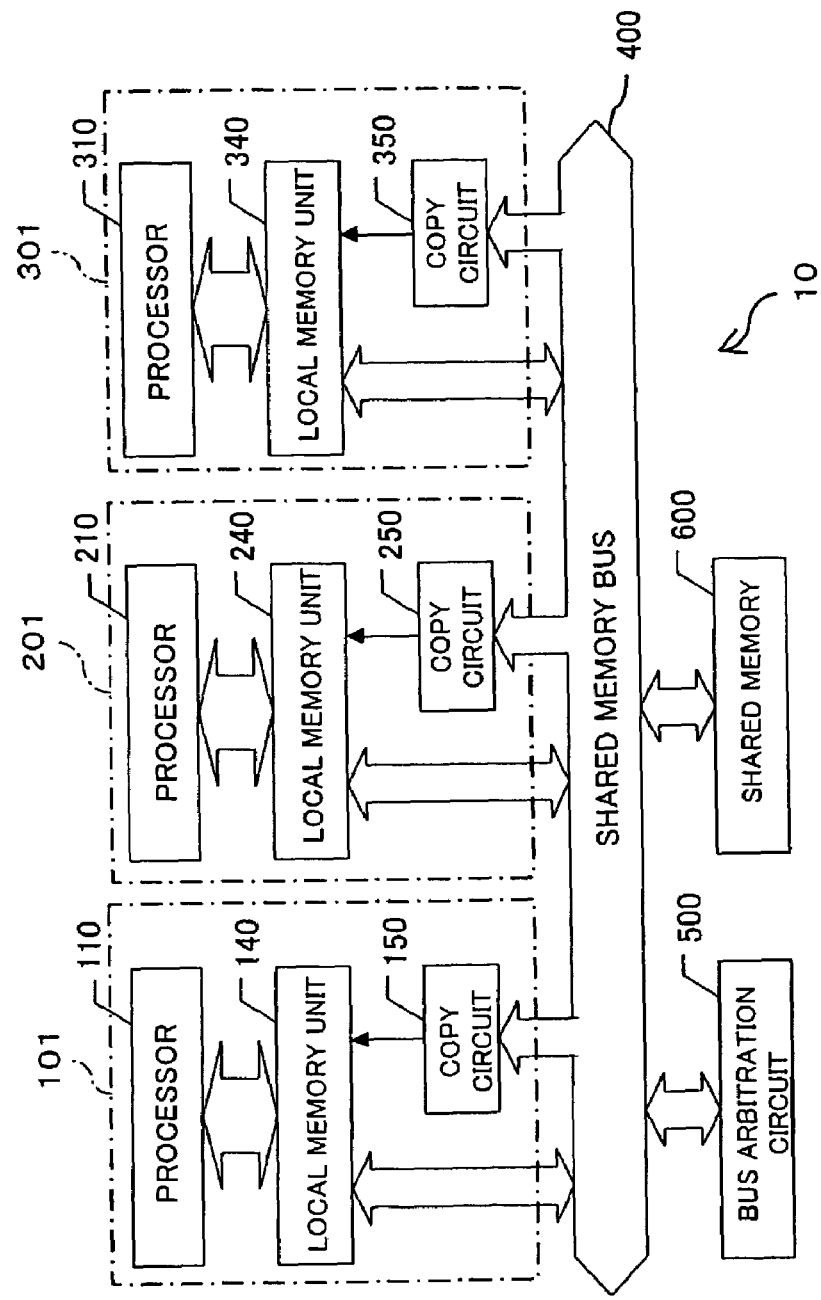
FIG. 1 is a block diagram showing an arrangement of a multiprocessor apparatus as a first embodiment of the present invention.

FIG. 1 is a block diagram showing an arrangement of a multiprocessor apparatus as a first embodiment of the present invention. As shown in FIG. 1, a multiprocessor apparatus 10 is capable of decreasing a waiting time of access to a shared memory 600 for reading data even if an application is executed in a real time manner in particular. For example, the multiprocessor apparatus 10 is composed of three processor units 101, 201, 301, a bus arbitration circuit 500, and the shared memory 600 interconnected to one another through a shared memory bus 400.

Figure 13:
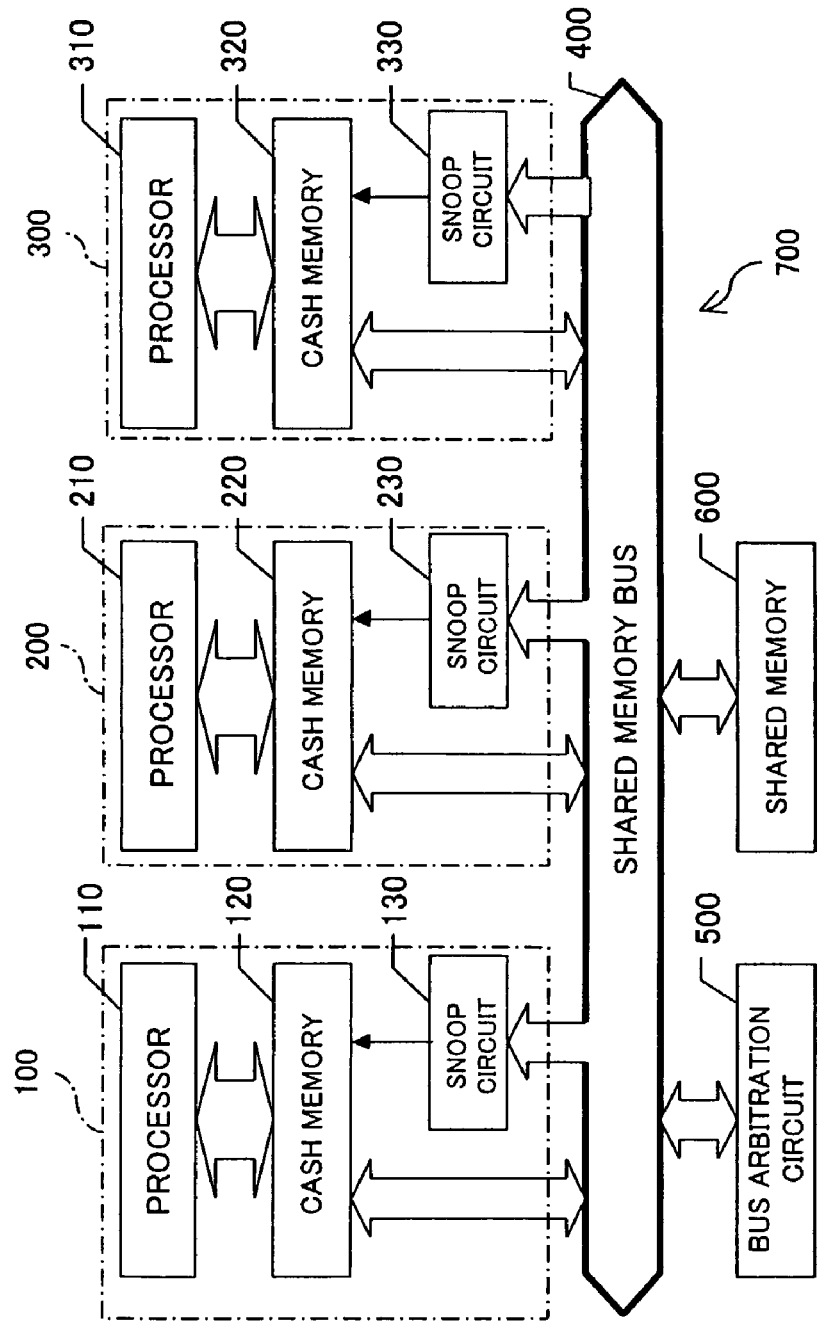
FIG. 13 is a block diagram showing an arrangement of a multiprocessor apparatus.

In the multiprocessor 10 shown in FIG. 1, similarly to the case of the aforesaid FIG. 13, the shared memory 600 serves as a unit for storing therein data which are commonly utilized upon executing the application by the respective processor units 101, 201, 301.

The shared memory bus 400 is utilized for transacting necessary information among each of the three processor units 101, 201, 301, bus arbitration circuit 500 and the shared memory 600. As will be described with reference to FIG. 3, the shared memory bus 400 is composed of an address bus 401 for transacting address information, a data bus 402 for transacting data, and a control bus 403 for transacting control information.

The bus arbitration circuit 500 is connected to the shared memory bus 400 and carries out arbitration on use of the bus by the processor units 101, 201, 301. That is, the bus arbitration circuit 500 effects arbitration when accesses to the shared memory 600 conflict one another.

Each of the processor units 101, 201, 301 is a unit for carrying out application processing independently. The processor unit 101 is composed of a local memory unit 140 and a copy circuit 150 which are characteristic constructing components of the invention of the subject application, together with the processor 110. In a similar manner, the processor unit 201 is composed of a processor 210, a local memory unit 240 and a copy circuit 250, and the processor unit 301 is composed of a processor 310, a local memory unit 340 and a copy circuit 350.

The processors 110, 210, 310 of the respective processor units 101, 201, 301 are each component for carrying out a command execution processing for carrying out various kinds of application processing. For example, the application processing may be one required to be processed in a real time processing.

Each of the local memory units 140, 240, 340 is interposed between the processor 110, 210, 310 and the shared memory bus 400, respectively. Each of the local memory units 140, 240, 340 can store therein a copy of the whole contents of the shared memory 600. The construction thereof is illustrated in FIG. 2, which will be described later on.

The copy circuit 150, 250, 350 is arranged in such a manner that when any processor 110, 210, 310 of the plurality of processor units 101, 201, 301 generates an update command to the shared memory 600 for updating the data stored in the shared memory 600 and the contents of the shared memory 600 are updated in response to the update command, then the copy circuit 150, 250, 350 controls the update processing in the local memory unit 140, 240, 340 of the corresponding processor unit 101, 201, 301, respectively.

With the above arrangement, even if the shared memory 600 is subjected to any writing operation by any of the processors 110, 210, 310, the copy circuit 150, 250, 350 follows the writing operation so that the contents of the local memory unit 140, 240, 340 are updated, respectively. That is, when any of the processors 110, 210, 310 requests a piece of data that shall be stored in the shared memory 600 with a data reading command, then the local memory unit 140, 240, 340 responds to the reading command to read the corresponding piece of data from the copied data stored in the local memory unit 140, 240, 340 and supplies the piece of data to the processor 110, 210, 310, respectively.

Figure 2:
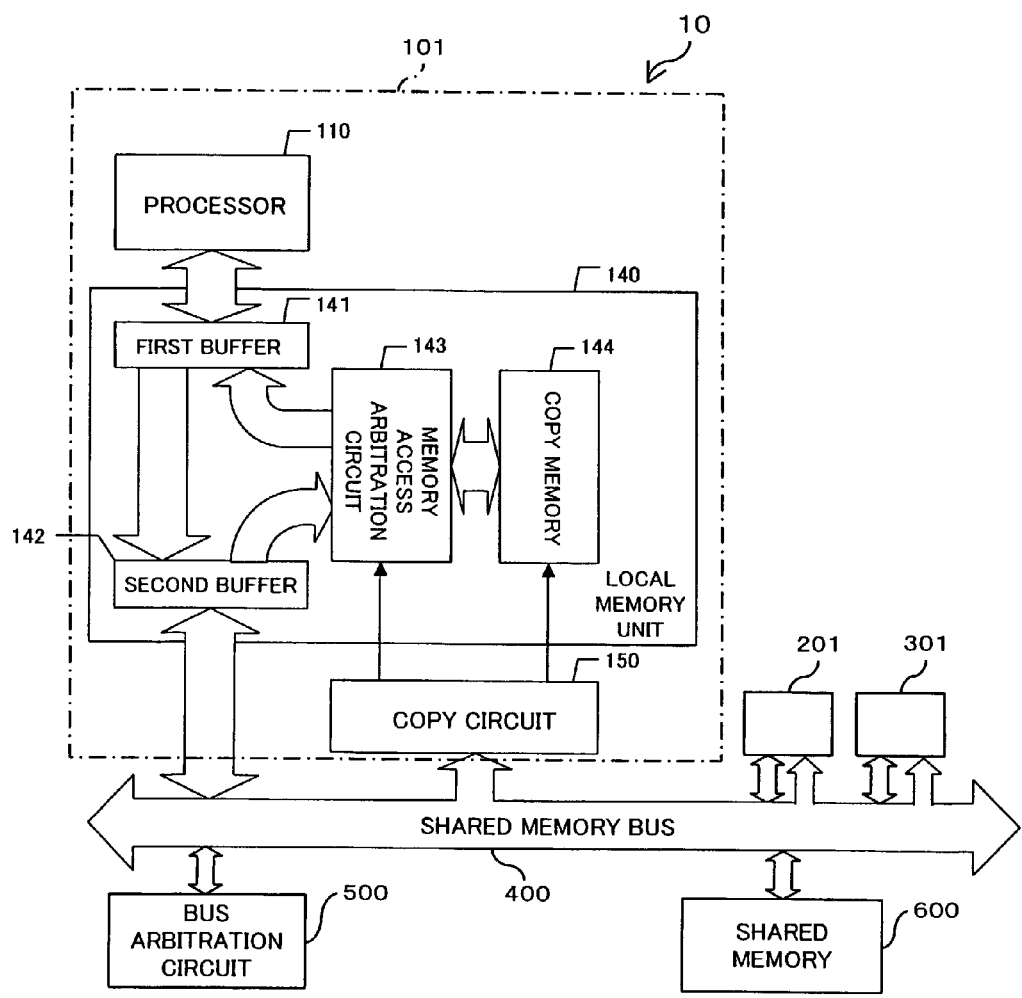
FIG. 2 is a block diagram showing an arrangement of one processor unit employed in the first embodiment with emphasis on an arrangement of a local memory unit.

FIG. 2 is a block diagram showing in detail an arrangement of the processor unit 101 with emphasis on an arrangement of the local memory unit 140. As shown in FIG. 2, the local memory unit 140 is arranged to include a first buffer 141, a second buffer 142, a memory access arbitration circuit 143 and a copy memory 144. Other local memory units, i.e., the local memory units 240 and 340 are also arranged in a manner similar to that of the local memory unit 140. Therefore, the following description will be mainly made on the arrangement of the local memory unit 140.

The copy memory 144 is a memory unit having a region for storing therein a copy of the whole contents of the shared memory. The first buffer 141 is connected bidirectionally to the processor 110 through a bus. Thus, the first buffer 141 temporarily stores therein address information of the aforesaid reading command from the processor 110 and read data. The first buffer 141 also temporarily stores therein address information as a target of update request for the shared memory 600 which is generated from the processor 110 to the second buffer 142, and corresponding data (write data). The second buffer 142 will be described later on.

The second buffer 142 is supplied, from the first buffer 141, with address and data (write data) as a target of update request of the shared memory 600 designated by the processor 110, and temporarily holds therein the address and the data. Also, the second buffer 142 is supplied with the contents (write data and address) of the shared memory 600 updated by any processor unit 201 or 301 of the processor 210 or 310 through the shared memory bus 400 and temporarily holds therein the address and the data. As will be described later on, the address and data stored in the second buffer 142 are written in the copy memory 144 based on the control of the copy circuit 150.

In other words, the second buffer 142 is connected to the first buffer 141 through the bus so that the address and the data are transferred in a single direction, i.e., the direction from the first buffer 141 to the second buffer 142. Further, the second buffer 142 is supplied with the address and the data as a target of writing from the processor 110 through the first buffer 141. Further, the second buffer 142 is connected to the shared memory bus 400. Thus, when the second buffer 142 is supplied through the shared memory bus 400 with the contents of the shared memory 600 which are updated by the processor 210 or the processor 310, then the second buffer 142 temporarily holds therein the supplied contents.

Furthermore, the second buffer 142 has the following function. That is, when the second buffer 142 holds the address and the data as a target of update request on the shared memory 600 designated by the processor 110, the second buffer 142 generates a use request of the shared memory bus 400 to the bus arbitration circuit 500 through a control bus 403 (see FIG. 3).

The memory access arbitration circuit 143 effects arbitration on reading access to the copy memory 144 based on the reading command from the processor 110 and update access for updating the contents of the copy memory 144 in accordance with the contents held in the second buffer 142, based on the control of the copy circuit 150. In other words, the memory access arbitration circuit 143 effects arbitration on the bus so that the read access on the side of the first buffer 141 and the write access on the side of second buffer 142 are satisfactorily carried out on the copy memory 144.

That is, the memory access arbitration circuit 143 is connected bidirectionally to the copy memory 144 through the bus, and connected to the first buffer 141 through the bus so that the address and the data as a target of reading can be outputted to the first buffer 141. Also, the memory access arbitration circuit 143 is connected to the second buffer 142 through the bus so that the address and the data as a target of update are supplied from the second buffer 142. Thus, the memory access arbitration circuit 143 effects arbitration on the data among the first buffer 141, the second buffer 142 and the copy memory 144.

FIG. 3 is a block diagram showing an arrangement including the copy circuit 150 and neighboring components employed in the processor unit 101. As shown in FIG. 3, the copy circuit 150 is arranged to include a transaction monitoring unit 151 and a copy processing control unit 152. Other copy circuits 250 and 350 are also arranged in a manner similar to that of the copy circuit 150. Therefore, the following description will be made in detail mainly on the arrangement of the copy circuit 150.

The transaction monitoring unit 151 is a unit for monitoring the transaction effected on the shared memory bus 400. In more concretely, the transaction monitoring unit 151 monitors the bus to determine whether or not any of the processors 101, 201, 301 issues a data update command to the shared memory 600 and the shared memory 600 responds to the data update command with an update completion response.

That is, if the aforesaid shared memory 600 generates the update completion response through the control bus 403, then the transaction monitoring unit 151 supplies the second buffer 142 with information indicative of a taking-in timing for taking the update address and relevant data in.

In other words, the second buffer 142 takes an update address and update data to which reference can be made on the address bus 401 and the data bus 402 during access, based on the taking-in timing supplied from the transaction monitoring unit 151.

The copy processing control unit 152 as an update control unit is a unit for controlling the update processing carried out in the local memory unit 140, based on the result of monitoring supplied from the transaction monitoring unit 151.

In more concretely, when any of the processors 110, 210, 310 generates the update command of the data to the shared memory 600 and the shared memory 600 responds to the command to generate the update completion response to the copy processing control unit 152 as a result of monitoring by the transaction monitoring unit 151 on the transaction effected on the shared memory bus 400, then the copy processing control unit 152 controls the update processing of the local memory unit 140 in accordance with the updated contents of the shared memory 600.

The aforesaid copy processing control circuit 152 controls the local memory unit 140 in its update processing in the following manner. That is, the copy processing control circuit 152 generates an update access request to the memory access arbitration circuit 143 so that data taken into the second buffer 142 are written into the copy memory 144 to achieve the update access, and the copy processing control circuit 152 goes to an waiting mode for awaiting a permission of the update access from the memory access arbitration circuit 143. When the copy processing control circuit 152 receives the permission of the update access from the memory access arbitration circuit 143, then the copy processing control circuit 152 generates an update direction to the copy memory 144.

In this way, if the copy circuit 150, 250, 350 receives from the shared memory 600, the update completion response which indicates that the data update has been completed on the shared memory 600 in accordance with the update command generated from any of the processors 110, 210, 310, then the copy circuit 150, 250, 350 controls the update processing on the local memory 140, 240, 340 in accordance with the update contents of the shared memory 600.

With the above arrangement, when the application processing is executed in the processor units 101, 201, 301 of the multiprocessor apparatus 10 as the first embodiment of the present invention, upon starting the operation, an initialization processing is carried out in such a manner that the contents of the shared memory 600 are written into the whole area of each copy memory 144, 244, 344 (whole region write processing) so that all data of the local memory units 140, 240, 340 and the shared memory 600 are made identical to each other.

When the above-described initialization processing is carried out, as will be described in detail hereinafter, the processor 110, 210,310 of the processor unit 101,201, 301 reads data from the local memory unit 140, 240, 340 and updates the data stored in the shard memory 600. In the following description, description will be made mainly on the operation of the processor unit 101. However, other processors 210 and 310 are operated in a manner similar to that of the processor 110 upon issuing a request.

Now detail description will be made on a case where the processor 110 issues a wiring request (write access request or update request) to the shared memory 600.

Figure 4A:
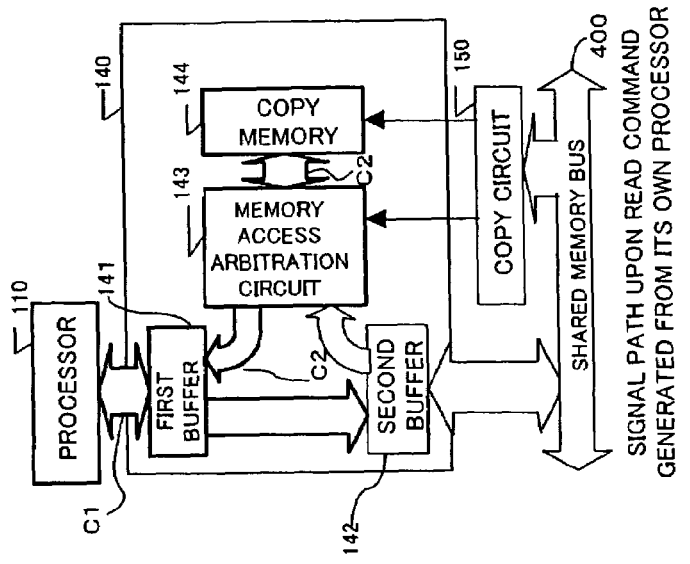
FIG. 4(a) is a diagram illustrating a signal path when a writing request is issued from the own processor unit.

That is, when the processor 110 makes a write access to the shared memory 600 as a write request, the address and data outputted from the processor 110 are transferred through the first buffer 141 and temporarily stored in the second buffer 142 (see reference symbols A1 and A2 in FIG. 4(a)).

The second buffer 142 requests a bus use right from the bus arbitration circuit 500 through the shared memory bus 400. The bus arbitration circuit 500 examines the using status of the shared memory bus 400 brought about by other processor units 201, 301, and sends a reply indicative of permission of use of the shared memory bus 400 based on the result of examination through the control bus 403 (see FIG. 3).

If the second buffer 142 receives the reply from the bus arbitration circuit 500, securing the bus use right, the second buffer 142 sends the address and data, which are temporarily stored in the second buffer 142 through the address bus 401 and the data bus 402 of the shared memory bus 400 to the shared memory 600 (see reference symbol A3 in FIG. 4(a)).

When the shared memory 600 receives the address and the data, the shared memory 600 replaces the data designated by the sent address which has been stored in the shared memory 600 so far with the data which is sent from the second buffer 142. In this way, the rewriting operation is completed. Then, the shared memory 600 outputs a normal response signal as a shared memory update reply through the control bus 403.

As shown in FIG. 3, the transaction monitoring unit 151 of the copy circuit 150 monitors the transaction effected on the shared memory bus 400 in such a manner that when the transaction monitoring unit 151 detects the normal response signal from the aforesaid shared memory 600 (see reference symbol A4 in FIG. 4(a)), the transaction monitoring unit 151 informs the copy processing control unit 152 that the update has been normally carried out.

The copy processing control circuit 152 controls the memory access arbitration circuit 143 and the copy memory 144 so that the address and data stored in the second buffer 142 are copied on the copy memory 144 (see reference symbol A5 in FIG. 4(a)). Thereafter, the contents of the second buffer 142 are written in the copy memory 144 (see reference symbol A6 in FIG. 4(a)), and the status of the data stored in the shared memory 600 and the status of the data stored in the copy memory 144 are made coincident with each other.

Subsequently, detail description will be made on an update operation of the local memory unit 140 when processors other than the processor 110, i.e., the processors 210 and 310 make write access to the shared memory 600.

When processors other than the processor 110, i.e., the processors 210 and 310 make write access to the shared memory 600, the second buffer 142 temporarily stores therein the address and data which are transferred through the shared memory bus 400, in response to a taking-in timing sent from the copy circuit 150.

In more concretely, the transaction monitoring unit 151 of the second buffer 142 monitors the transaction effected on the shared memory bus 400. When the transaction monitoring unit 151 detects the normal response signal from the aforesaid shared memory 600 (see reference symbol B1 in FIG. 4(b)), the transaction monitoring unit 151 generates a signal indicative of a timing for taking in the address and data for update provided on the shared memory bus 400 (i.e., on the shared memory 600) and supplies the signal to the second buffer 142 (see reference symbol B2 in FIG. 4(b)). Then, the transaction monitoring unit 151 informs the copy processing control unit 152 that the update has been normally carried out.

Figure 4B:
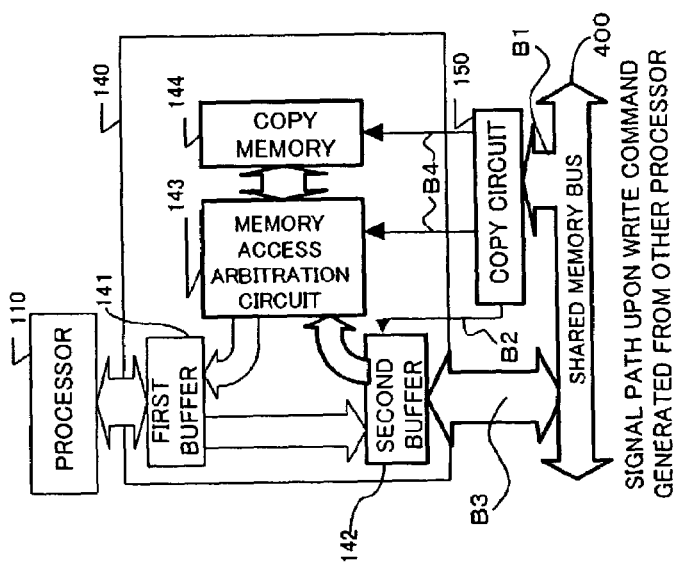
FIG. 4(b) is a diagram illustrating a signal path when a writing request is issued from other processor unit.

When the second buffer 142 receives the signal indicative of a timing for taking the address and data for update in, the second buffer 142 takes the address and data in which have been subjected to the update in the shared memory 600, through the shared memory bus 400 (see reference symbol B3 in FIG. 4(b)).

After the copy processing control circuit 152 has been informed that the update has been normally carried out, the copy processing control circuit 152 controls the memory access arbitration circuit 143 and the copy memory 144 so that the address and data taken in the second buffer 142 through the shared memory bus 400 are copied on the copy memory 144 (see reference symbol B4 in FIG. 4(b)). Thereafter, the contents of the second buffer 142 are written in the copy memory 144 (see reference symbol B5 in FIG. 4(b)), and the status of the data stored in the shared memory 600 and the status of the data stored in the copy memory 144 are made coincident with each other.

As described above, when the contents of the shared memory 600 are updated, owing to the control of the copy circuits 150, 250, 350, the contents of the copy memories of the local memory units 140, 240, 340 are updated so as to be coincident with those of the shared memory 600. Therefore, when the processors 110, 210, 310 access the respective local memory units 140, 240, 340 to obtain data, each of the processors 110, 210, 310 can read the same data as those stored in the shared memory 600 without accessing the shared memory 600.

Figure 4C:
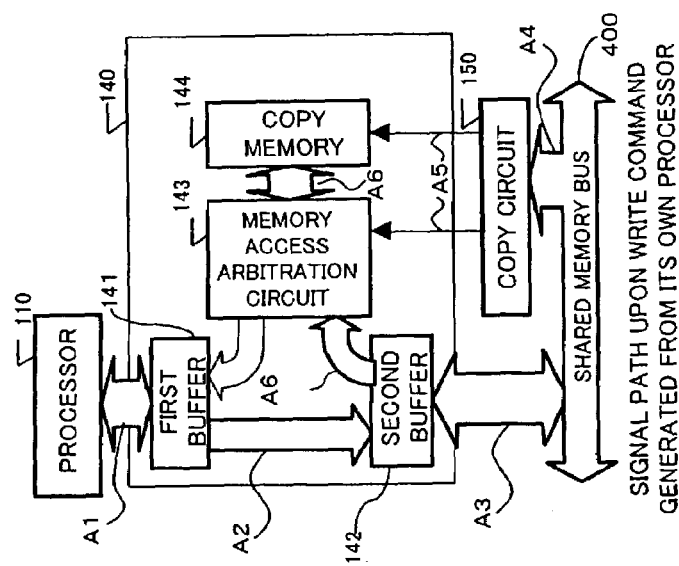
FIG. 4(c) is a diagram illustrating a signal path when a reading request is issued from the own processor unit.

For example, when the processor 110 itself issues a read request (read access request), the first buffer 141 temporarily stores therein the address outputted from the processor 110 in response to the read access made by the processor 110 to the shared memory 600 (see reference symbol C1 in FIG. 4(c)).

The first buffer 141 requests a read access permission from the memory access arbitration circuit 143 so that the first buffer 141 is allowed to read data from the copy memory 144. Thus, the first buffer 141 can obtain the same data as those stored in the shared memory 600 (see reference symbol C2 in FIG. 4(c)). If the state of access allows the first buffer 141 to read data from the copy memory 144, the memory access arbitration circuit 143 reads from the copy memory 144, data corresponding to the address which is temporarily stored in the first buffer 141, and transfers the data to the processor 110 by way of the first buffer 141.

In this way, if the local memory unit 140, 240, 340 receives a reading command of data stored in the shared memory 600 from the processor 110, 210, 310, then the corresponding data copied in the local memory unit 140, 240, 340 are read and generated from the local memory unit 140, 240, 340.

As described above, according to the arrangement of the multiprocessor apparatus 10 of the first embodiment, the processor units 101, 201, 301 include the processors 110, 210, 310, the local memory units 140, 240, 340, and the copy circuits 150, 250, 350, respectively. Therefore, the copy of the whole data stored in the shared memory 600 are also stored in the copy memory which is governed under each of the processors 110, 210, 310. Accordingly, the transaction due to the read access can be prevented from being brought about on the shared memory bus 400, with the result that it becomes possible to suppress the conflict of the shared memory bus 400 (conflict control). In particular, even if the multiprocessor apparatus is placed under a real time processing environment, the data invalidating processing, read-retrying processing or the like can be prevented from being increased on the cache memory as in the case where the multiprocessor apparatus employs a cache memory system. In this way, access to the shared memory 600 for obtaining necessary data can be carried out with a minimum waiting time.

[B] Description of Second Embodiment

Figure 5:
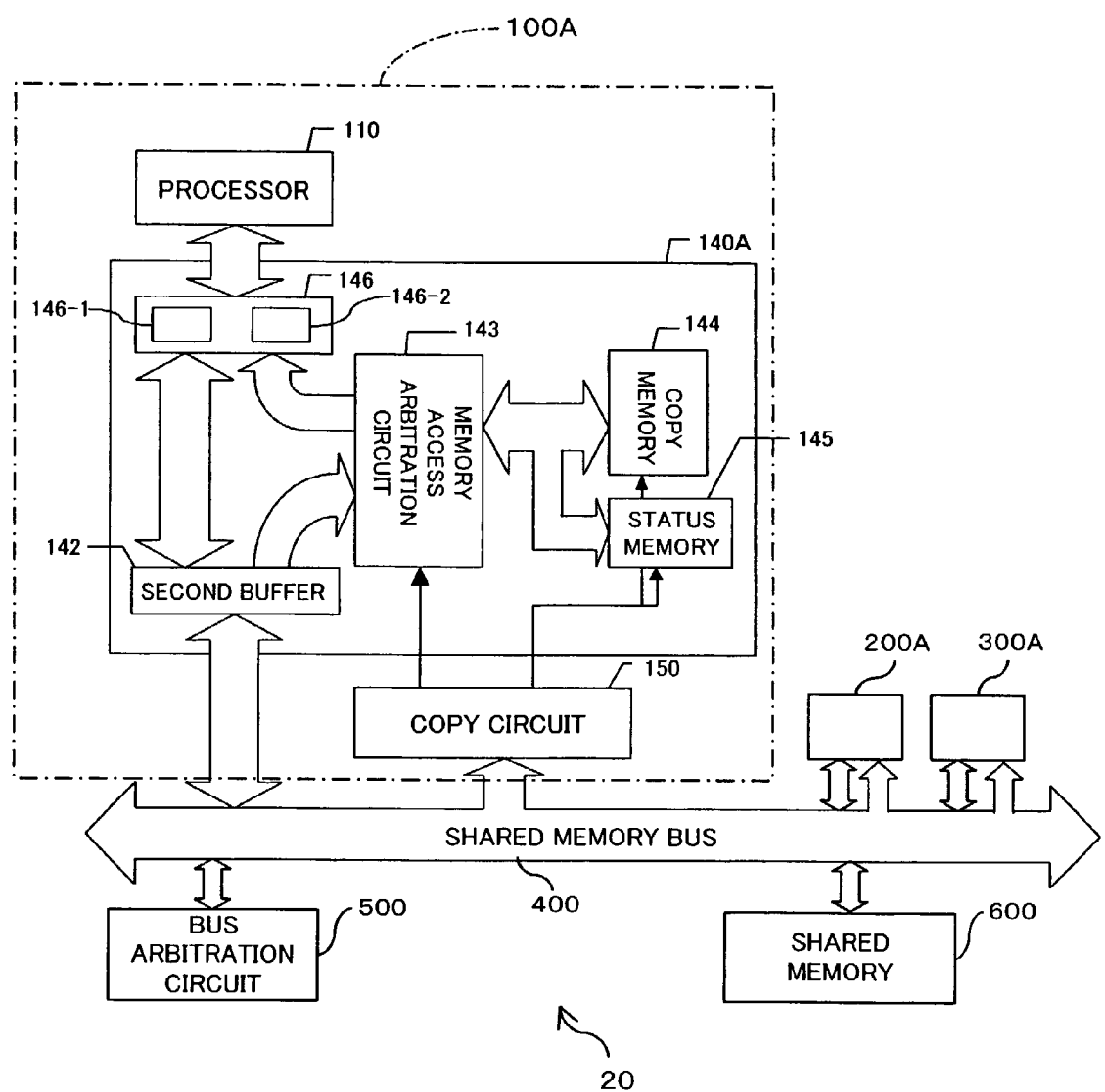
FIG. 5 is a block diagram showing an arrangement of a multiprocessor apparatus as a second embodiment of the present invention.

FIG. 5 is a block diagram showing a main portion of an arrangement of the multiprocessor apparatus as a second embodiment of the present invention. As shown in FIG. 5, an arrangement of a multiprocessor apparatus 20 is different from that of the first embodiment (see reference numeral 10) in that the arrangement of the second embodiment is provided with processor units 100A, 200A, 300A each having a local memory with an improved function. But arrangement except for what mentioned above is fundamentally similar to that of the first embodiment.

FIG. 5 mainly illustrates the construction of the processor unit 100A and its neighboring components of the multiprocessor apparatus 20, and the arrangement of the processor units 200A and 300A are not shown. However, the processor units 200A and 300A also have a construction similar to that of the processor unit 100A.

As shown in FIG. 5, an arrangement of a local memory unit 140A is different from that of the local memory unit 140 of the first embodiment in the following points. That is, the first buffer 141 of the local memory unit 140 is replaced with a first buffer 146 having a status determining function, and a status memory 145 is additionally provided. The second buffer 142 and the memory access arbitration circuit 143 provided in the local memory unit 140A are same as those in the above-described local memory unit 140.

Figure 6:
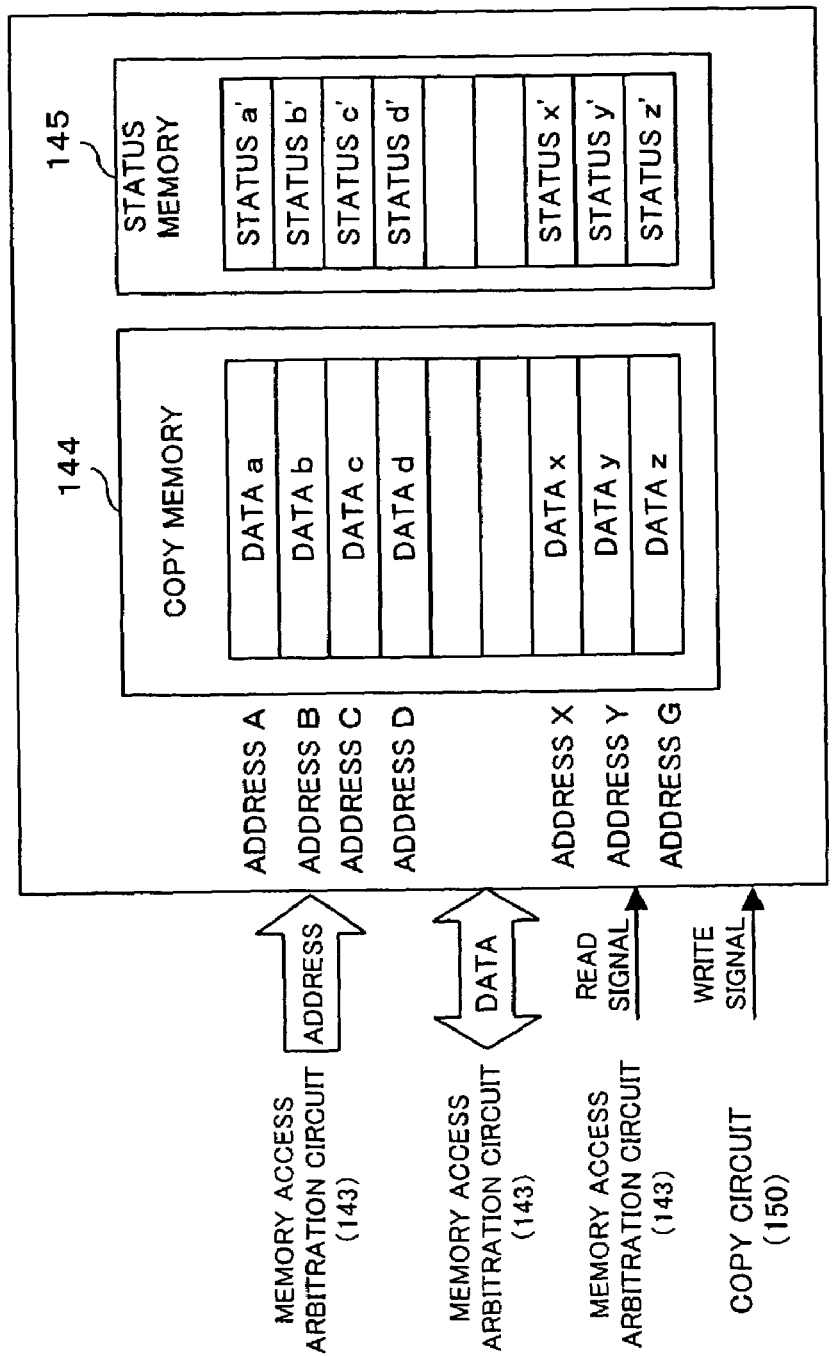
FIG. 6 is a diagram showing an arrangement of a status memory of the second embodiment of the present invention.

The status memory 145 is a unit for recording therein information indicating whether or not data stored in the copy memory 144 at the corresponding address is last updated one. the arrangement of the status memory 145 is illustrated in detail in FIG. 6.

That is, the arrangement of the status memory 145 is such that partitioned areas for respective status bits ('a' to 'z') correspond to respective data areas of minimum access units (e.g., address 'A' to 'Z') of the copy memory 144. FIG. 6 shows that the copy memory 144 and the status memory 145 can receive address information, data information and read signal from the memory access arbitration circuit 143 and a write signal from the copy circuit 150 in a parallel fashion.

The status memory 145 is made to have data stored in the memory region thereof in the following manner. That is, when the respective processors 100A, 200A, 300A are energized at their initial state, the status memory 145 is placed under the control of the copy circuit 150 in such a manner that a bit value indicative of data absence is stored in each unit area which is partitioned based on the minimum access unit. Conversely, when an initial access is made to the shared memory 600 at any of the respective addresses ('a' to 'z'), the status memory 145 comes to have a bit value indicative of data presence stored in accordance with the control of the copy circuit 150.

That is, in the copy processing circuit 152 of the copy circuit 150, similarly to the above-described first embodiment, when the copy processing circuit 152 receives a message stating that the update completion response of the shared memory 600 has been received from the transaction monitoring unit 151, in order for copying the address and data taken in and stored in the second buffer 142 on the copy memory 144, the memory access arbitration circuit 143 and the copy memory 144 are controlled. At the same time, the bit value indicative of data presence is stored in the status memory 145 at the status bit corresponding to the update address.

When the bit value indicative of the data presence is stored in the status memory 145, the contents held in the second buffer 142 will be copied for updating on the copy memory 144 to carry out the update access. However, this operation may suffer from accident such that the transaction monitoring unit 151 fails in detecting the normal response signal, for example. In this case, the bit value indicating that there is no data stored is memorized in the status memory 145 at the corresponding address region. In this way, data stored in the copy memory 144 are improved in reliability.

Similarly to the above-described first embodiment, the first buffer 146 is connected bidirectionally to the processor 110 through a bus. The first buffer 146 serves as a unit for temporarily holding read data and write data. The first buffer 146 is arranged to include a status determining unit 146-1 and a reading processing unit 146-2.

The status discriminating unit 146-1 of the first buffer 146 is a unit for determining the recording of the status memory when data corresponding to the reading command from the processor 110 is read from the copy memory 144. That is, the status determining unit 146-1 reads a status bit corresponding to the reading command from the status memory 145 and determines the contents of the read status bit, i.e., determines whether the bit indicates that there is data stored or there is no data stored.

The reading processing unit 146-2 is a unit for selectively carrying out the following operations in accordance with the result of the determination made by the status determining unit 146-1. That is, when it is determined that the update data corresponding to the reading command address is held, then the reading processing unit 146-2 outputs the held data to the processor 110 while when it is not determined that the update data is held, then processing for reading data is carried out from the shared memory 600.

In more concretely, if the status bit information of the status memory 145 indicates that there is data stored as a result of the determination made by the status determining unit 146-1, which fact ensures that the data stored in the copy memory 144 is the last updated version of data and hence the data is read from the copy memory 144. On the other hand, if the status bit information of the status memory 145 indicates that there is no data stored as a result of the determination made by the status determining unit 146-1, then data stored in the shared memory 600 is read by way of the second buffer 142.

Similarly to the case where writing access is made on the shared memory 600, the second buffer 142 generates a bus use request to the bus arbitration circuit 500 to obtain a bus use right and after obtaining the bus use right, the second buffer 142 takes in the address and data as a target of reading from the shared memory 600 through the shared memory bus 400.

In the above-described first embodiment, the first buffer 141 and the second buffer 142 provided in the local memory unit 140 are connected to each other through a data bus and an address bus which allow a single direction transfer from the first buffer 141 to the second buffer 142. However, in the second embodiment, the first buffer 146 and the second buffer 142 provided in the local memory unit 140A are connected to each other through a data bus and an address bus which allow bidirectional transfer between the first buffer 146 to the second buffer 142.

As described above, according to the arrangement of the multiprocessor apparatus 20 of the second embodiment of the present invention, each of the processor units 100A, 200A, and 300A is arranged to include a status memory (in the processor unit 100A, a block identified by reference numeral 145), and mode of read access is selectively made from the first buffer (146) depending on whether data stored in the copy memory (144) is the last updated data or not. Therefore, the copy memory (144) need not undergo the write processing with the whole memory region upon starting the operation, unlike the case of the above-described first embodiment.

Now description will be made in detail on a case of operation effected in the processor unit 100A in which a write request is issued from the processor 110 to the shared memory 600.

That is, when the processor 110 makes a write access to the shared memory 600, the address and data as a target of the write access generated from the processor 110 are transferred through the first buffer and temporarily stored in the second buffer 142.

The second buffer 142 requests a bus use right from the bus arbitration circuit 500 of the shared memory bus 400. When the second buffer 142 secures the bus use right, the second buffer 142 sends the address and data temporarily stored therein to the shared memory bus 400.

When the transaction monitoring unit 151 of the copy circuit 150 detects a normal response signal from the shared memory 600, in order that the address and data stored in the second buffer 142 are copied in the copy memory 144, the copy processing control unit 152 controls the memory access arbitration circuit 143 and the copy memory 144, whereby the status of data stored in the shared memory 600 and the status of data stored in the copy memory 144 are coincident with each other. At this time, information indicating that there is data stored is written in the status memory 145 at the status bit of the corresponding address.

If the processor 110 issues a read request, the processor unit 110A is operated as follows.

Initially, the read request generated from the processor 110 is temporarily stored in the first buffer 146. In order to read the copy data stored in the copy memory 144 which corresponds to the target address of the read request and derives from the copying from the shared memory 600, and also read the status bit stored in the status memory 145, the first buffer 146 requests a read access right from the memory access arbitration circuit 143 to read data from the copy memory 144.

If the state of memory access is placed in a reading-allowable state, the memory access arbitration circuit 143 issues a reading access permission so that copy data corresponding to the address temporarily stored in the first buffer 146 are read from the copy memory 144 and the status bit is read from the status memory 145, respectively, and the read data are transferred to the first buffer 146.

The status determining unit 146-1 of the first buffer 146 determines whether the status bit read from the status memory 145 is one indicative of the data presence or one indicative of the data absence. If it is determined that the status bit is one indicative of the data presence, then the data read from the copy memory 144 is returned from the reading processing unit 146-2 to the processor 110.

Conversely, if the status determining unit 146-1 determines that the status bit is one indicating that there is no data stored, then the reading processing unit 146-2 reads data of the corresponding address from the shared memory 600 through the second buffer 142, and returns the same to the processor 110.

When the copy circuit 150 detects a normal response signal (indicating that the reading operation has been satisfactorily carried out) from the shared memory 600, in order that the address and data stored in the second buffer 142 are copied in the copy memory 144, the copy processing control unit 152 controls the memory access arbitration circuit 143 and the copy memory 144, whereby the status of data stored in the shared memory 600 and the status of data stored in the copy memory 144 are coincident with each other. At this time, information indicating that there is data stored is written in the status memory 145 at the status bit of the corresponding address.

Subsequently, description will be made in detail on how the update operation is effected on the shared memory 600 when other processors 210 and 310 than the processor 110 make write access to the shared memory 600.

Similarly to the case of the above-described first embodiment, when the processors of other processor units 200A and 300A make write access to the shared memory 600, the second buffer 142 receives a take-in timing from the copy circuit 150 and stores therein the address and data on the shared memory bus 400.

After the copy processing control unit 152 of the copy circuit 150 receives from the transaction monitoring unit 151 a message indicating that a normal response signal is received from the shared memory 600, the copy processing control unit 152 controls the memory access arbitration circuit 143 and the copy memory 144, whereby the address and data stored in the second buffer 142 are copied on the copy memory 144. At this time, information indicating that there is data stored is written in the status memory 145 at the status bit of the corresponding address.

In the multiprocessor apparatus of the second embodiment, even if any processor unit is energized after other processor units are operated and the copy memory of the later energized processor unit has not undergone the copying operation from the shared memory 600 yet, the later energized processor unit can obtain data by reading the data directly from the shared memory 600. Therefore, in comparison with the case of the first embodiment, it is unnecessary to carry out the initializing operation (i.e., writing processing is effected over the whole region of the copy memory) on the later-energized processor unit and hence operation can be swiftly started.

At this time, in the stage upon energizing the processors, it is expected that read access to the shared memory 600 is frequently brought about, with the result that conflict is increased on the shared memory bus 400 in a moment. However, from the timing point when at least one access is made to the shared memory 600 at all the addresses, all read access is made to the copy memory. Therefore, conflict expected to occur in the shared memory bus 400 (conflict control) after the timing point can be suppressed to the minimum. Accordingly, it becomes possible to shorten the waiting time of access due to the bus conflict.

As described above, according to the arrangement of the multiprocessor apparatus 20 of the second embodiment of the present invention, the local memory unit (in case of the processor unit 100A, the unit identified by reference numeral 140A) in each of the processor units 100A, 200A and 300A is provided with the status memory (in case of the processor unit 100A, the unit identified by reference numeral 145) and the first buffer (in case of the processor unit 100A, the unit identified by reference numeral 146). Therefore, each of the processors 110, 210, 310 can be supplied with data that is coincident with the requested one depending on whether the data last updated in the shared memory 600 has been copied to the copy memory or not. Accordingly, similarly to the case of the above-described first embodiment, it becomes possible to shorten the waiting time of access due to the bus conflict. Moreover, it becomes possible to obviate the initializing processing for making the whole data stored in the three copy memories coincident with one another.

When information indicative of the data presence is stored in the status memory (in case of the processor unit 100A, the unit identified by reference numeral 145), update access is tried so that the contents held in the second buffer (in case of the processor unit 100A, the unit identified by reference numeral 142) are copied for updating the contents of the copy memory (in case of the processor unit 100A, the unit identified by reference numeral 144). However, this operation may suffer from any accident such that the transaction monitoring unit (in case of the processor unit 100A, the unit identified by reference numeral 151, see FIG. 3) fails in detecting the normal response signal, for example. In this case, the information indicating that there is no data stored may be memorized in the status memory (in case of the processor unit 100A, the unit identified by reference numeral 145) at the corresponding address region. In this way, data stored in the copy memory (in case of the processor unit 100A, the unit identified by reference numeral 144) are improved in reliability.

[C] Description of Third Embodiment

Figure 7:
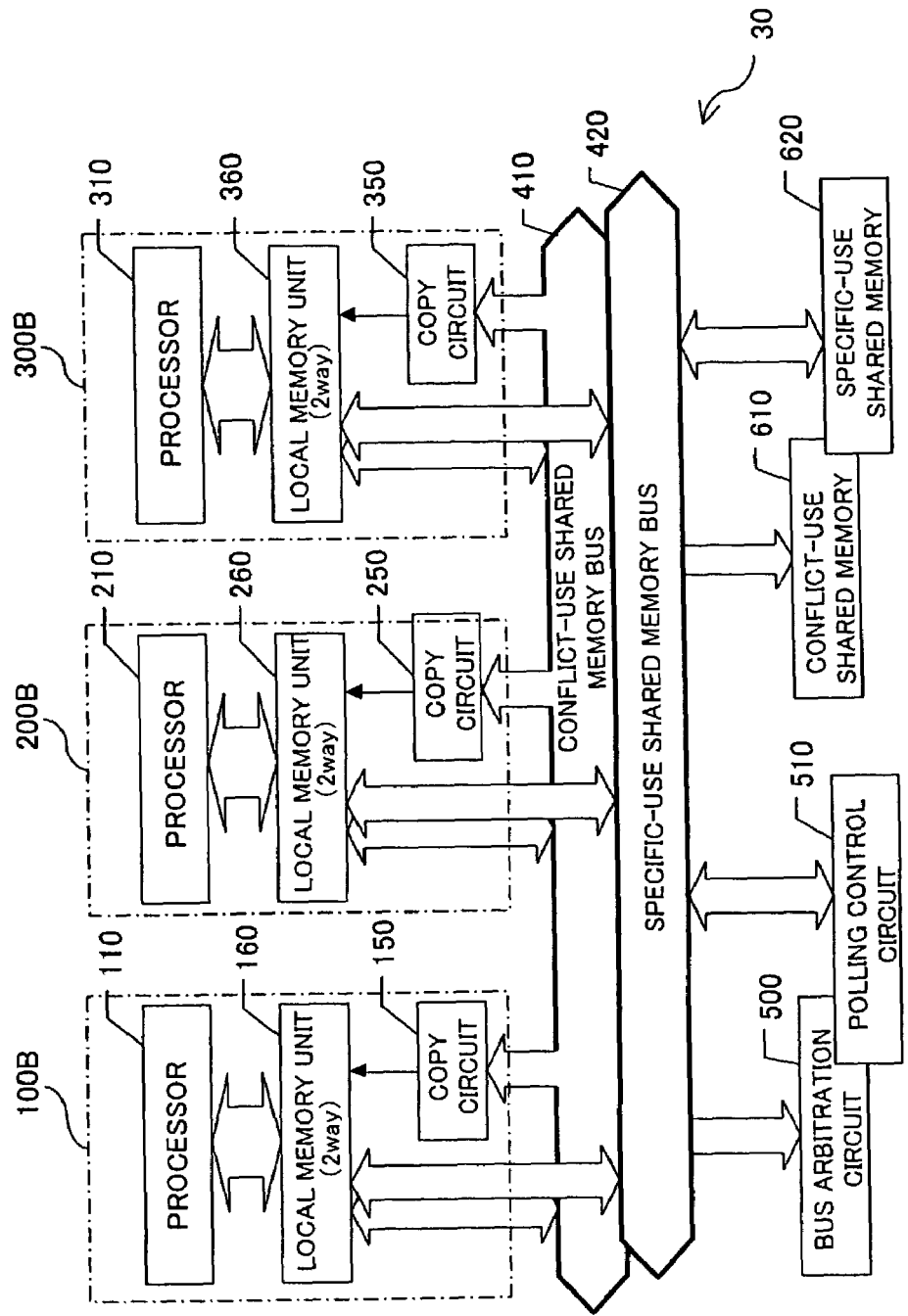
FIG. 7 is a block diagram showing an arrangement of a multiprocessor apparatus as a third embodiment of the present invention.

FIG. 7 is a block diagram showing an arrangement of a multiprocessor apparatus as a third embodiment of the present invention. As shown in FIG. 7, a multiprocessor apparatus 30 is mainly different from the aforesaid first embodiment (see arrangement identified by reference numeral 10) in the following points. That is, the shared memory bus is separately composed of a conflict-use shared memory bus 410 and an specific-use shared memory bus 420. Further, the shared memory 600 is also separately composed of a conflict-use shared memory 610 and an specific-use shared memory 620.

The conflict-use shared memory bus 410 is connected to each of processor units 100B, 200B, 300B, the conflict-use shared memory bus 610 and the bus arbitration circuit 500. On the other hand, the specific-use shared memory bus 420 is connected to each of processor units 100B, 200B, 300B, the specific-use shared memory 620 and a polling control circuit 510. Similarly to the aforesaid first and second embodiments, these buses 410 and 420 may be arranged to include an address bus, a data bus and a control bus, although not shown.

Each of the processor units 100B, 200B, 300B is different from the aforesaid first embodiment in that each local memory unit 160, 260, 360 is a two-way local memory unit, respectively. Components other than the local memory unit 160, 260, 360, i.e., the processor and the copy circuit have fundamentally the same arrangement as those of the first embodiment. In FIG. 7, components identified by the same reference numerals as those in FIG. 1 are substantially the same components, respectively.

Each of the processor units 100B, 200B, 300B is arranged to activate software based on classification which classifies data handled by the processors into data frequently utilized and shared in a real time fashion and data not frequently utilized and shared in a real time fashion. The hardware components placed in the subsequent stage such as the local memory units 160, 260, 360 can be informed of the result of classification in such a manner that, for example, the address regions for the classification information are separately provided or a particular bit is additionally prepared for discriminating the data attribute.

The conflict-use shared memory (first shared memory) 610 is a memory unit for storing therein the data frequently accessed (utilized) in a real time fashion when the processor unit 100B, 200B, 300B executes application processing. Conversely, the specific-use shared memory (second shared memory) 620 is a memory unit for storing therein the data of transaction with a low real-time property, i.e., data not frequently utilized in a real time fashion upon a rare case such as when processing is relayed from one of the processors 110, 210, 310 to another for overcoming a failure brought about in one of the processors 110, 210, 310.

Figure 8:
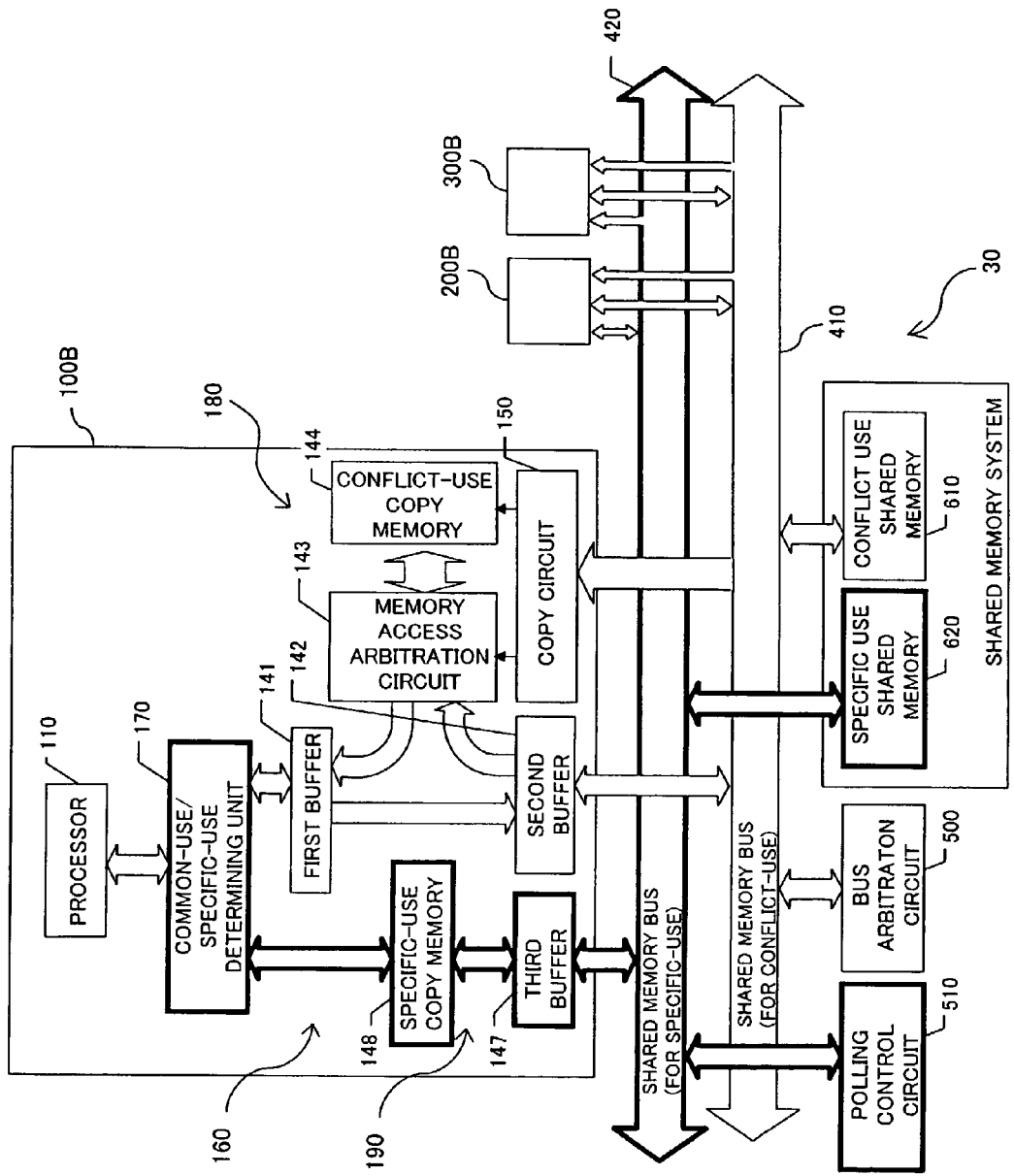
FIG. 8 is a block diagram showing in more detail the arrangement of the multiprocessor apparatus as the third embodiment of the present invention.

FIG. 8 is a block diagram showing in more detail the arrangement of the multiprocessor apparatus as the third embodiment of the present invention. As shown in FIG. 8, the local memory unit 160 is arranged to include a common-use/specific-use determining unit 170, a first local memory unit 180, and a second local memory unit 190. Similarly, the local memory unit 260 is arranged to include a common-use/specific-use determining unit, a first local memory unit, and a second local memory unit, although not shown. Also, the local memory unit 360 is arranged to include a common-use/specific-use determining unit, a first local memory unit, and a second local memory unit, although not shown.

The local memory units 260 and 360 have substantially the same arrangement as that of the local memory unit 160. Therefore, the following description will be made mainly on the arrangement of the local memory unit 160.

The common-use/specific-use determining unit 170 of the local memory unit 160 is a unit for classifying data as a target of reading command or an update command delivered from the processor 110 into data of a high frequency group utilized at a relatively high frequency by the processor units 100B to 300B and data of a low frequency group utilized at a relatively low frequency by the same processors, in accordance with whether the aforesaid address region or the particular bit is added or not. Therefore, the common-use/specific-use determining unit 170 functions as a classifying unit.

In other words, the common-use/specific-use determining unit 170 determines whether the data as a target of reading command or an update command delivered from the processor 110 are the data frequently utilized in a real time fashion and hence to be stored in the conflict-use shared memory 610 or the data of transaction with a low real-time property, i.e., data not frequently utilized in a real time fashion upon a rare case such as when processing is relayed from one of the processor units 100B, 200B, 300B to another for overcoming a failure brought about in one of the processor units 100B, 200B, 300B and hence to be stored in the common-use shared memory 620.

Moreover, if it is determined that the data is one utilized in common in a real time fashion at a relatively high frequency as a result of the above-described determination, then the common-use/specific-use determining unit 170 outputs the aforesaid reading command and the update command selectively to the first memory unit 180. Conversely, if it is determined that the data is one utilized in common in a real time fashion at a relatively low frequency as a result of the above-described determination, then the common-use/specific-use determining unit 170 selectively outputs the aforesaid reading command and the update command to the second memory unit 190.

The first local memory unit 180 is a unit for storing therein a copy of the whole data of the conflict-use shared memory 610. As shown in FIG. 8, similarly to the local memory unit 140 of the first embodiment (see FIG. 2), the first local memory unit 180 is arranged to include the first buffer 141, the second buffer 142, the memory access arbitration circuit 143 and the copy memory 144.

That is, the whole data of the conflict-use shared memory 610 are memorized in the copy memory 144. In FIG. 8, components substantially the same as those in FIG. 2 are identified by the same reference numerals.

The second local memory unit 190 is a unit for storing therein a copy of the whole data of the common-use shared memory 620. The second local memory unit 190 is arranged to include the third buffer 147 and an specific-use copy memory 148.

The specific-use copy memory 148 is interposed between the common-use/specific-use determining unit 170 and the third buffer 147. The specific-use copy memory 148 serves as a unit for storing therein a copy of the whole data of the specific-use shared memory 620. The third buffer 147 is interposed between the specific-use copy memory 148 and the specific-use shared memory bus 420. The third buffer 147 serves as a unit for storing therein an address and data updated at every polling interval in the specific-use copy memory 148 in accordance with the control of the polling control circuit 510 which will be described later on.

The copy circuit 150 is a unit for controlling the update processing of the copy memory 144 in the first local memory unit 180 when any processor of the processor units 100B, 200B, 300B changes the contents of the conflict-use shared memory 610.

In this way, even if the contents of the conflict-use shared memory 610 are updated by any of the processor units 100B, 200B, 300B, the contents of the copy memory 144 are also updated so as to be coincide with the contents of the conflict-use shared memory 610. Therefore, when the first local memory unit 180 receives a reading command requesting data memorized in the conflict-use shared memory 610 from the processor 110, the first local memory unit 180 can respond to the reading command by reading the corresponding data copied in the first local memory unit 180.

The bus arbitration circuit 500 is a unit connected to the conflict-use shared memory bus 410. The bus arbitration circuit 500 serves as a unit for effect arbitration on the bus use by the processor units 100B, 200B, 300B when accesses to the conflict-use shared memory 610 of the processor units 100B, 200B, 300B conflict with one another.

The polling control circuit 510 functions as a second bus use managing circuit for managing the use of the specific-use shared memory bus 420 by the processor units 100B, 200B, 300B. The polling control circuit 510 controls the specific-use shared memory bus 420 extending between the third buffer 147 and the specific-use shared memory 620 so that data access through the bus is controlled in a polling system.

Figure 9:
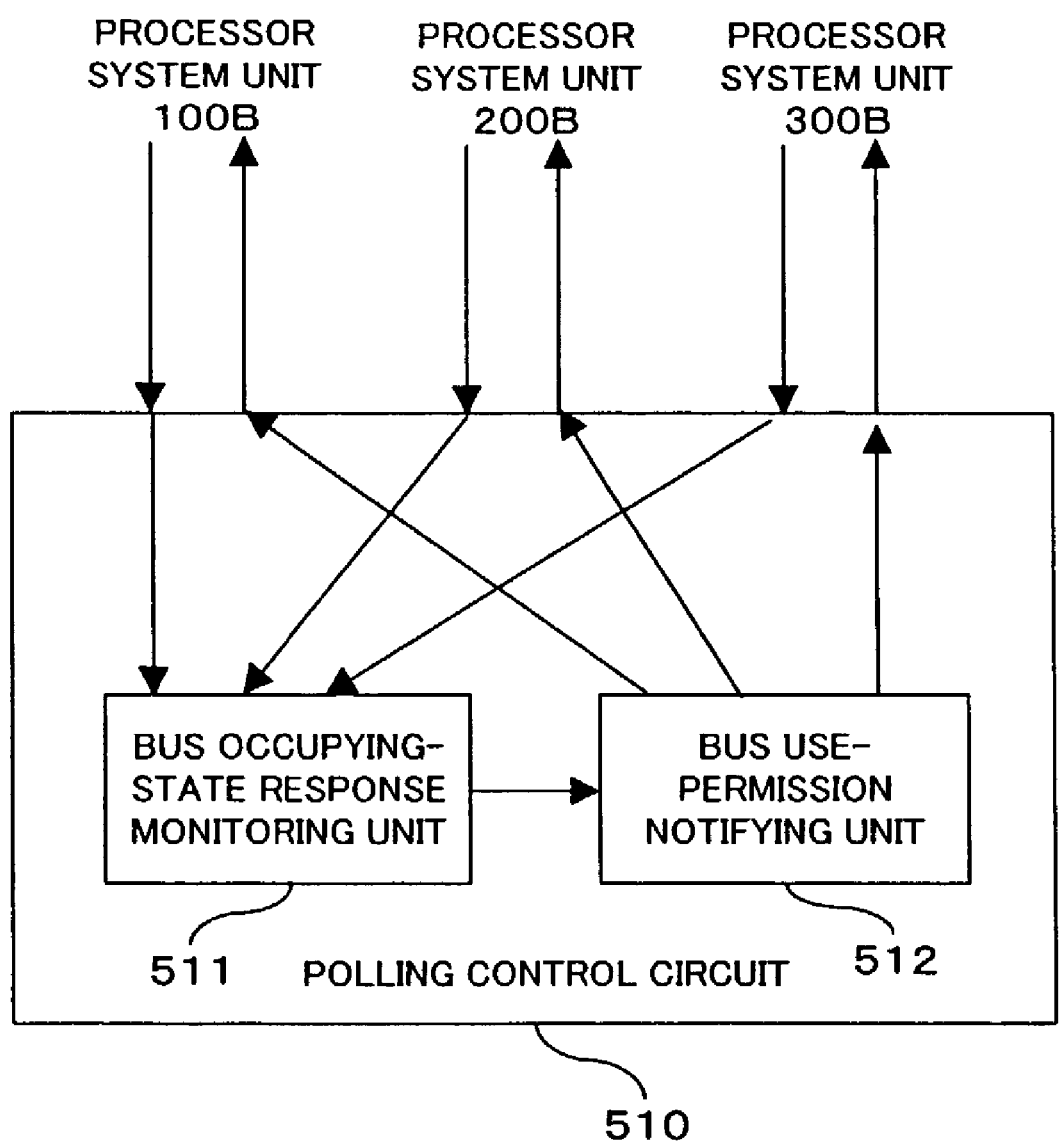
FIG. 9 is a block diagram showing an arrangement of a polling control circuit of the third embodiment of the present invention.

FIG. 9 is a block diagram showing an arrangement of a polling control circuit of the third embodiment of the present invention. As for example shown in FIG. 9, the polling control circuit 510 is arrange to include a bus occupying-state notice monitoring unit 511 and a bus use-permission notifying unit 512.

The bus occupying-state notice monitoring unit 511 ordinarily monitors the status of a bus occupying-state notice signal supplied from any of the processor units 100B, 200B, 300B through the specific-use shared memory bus 420. If it is detected that the bus occupying-state notice signal takes an invalid mode, or alternatively, if the bus occupying-state notice monitoring unit 511 receives no bus occupying-state notice signal for a predetermined period of time, then the bus occupying-state notice monitoring unit 511 generates a bus use-free-state notice to the bus use-permission notifying unit 512.

The bus use-permission notifying unit 512 is arranged to be capable of receiving the bus use-free-state notice from the bus occupying-state notice monitoring unit 511. When the bus use-permission notifying unit 512 receives the bus use-free-state notice from the bus occupying-state notice monitoring unit 511, then the bus use-permission notifying unit 512 notifies a processor unit requesting the bus use right of the specific-use shared memory bus 420 of a bus use permission.

Figure 10:
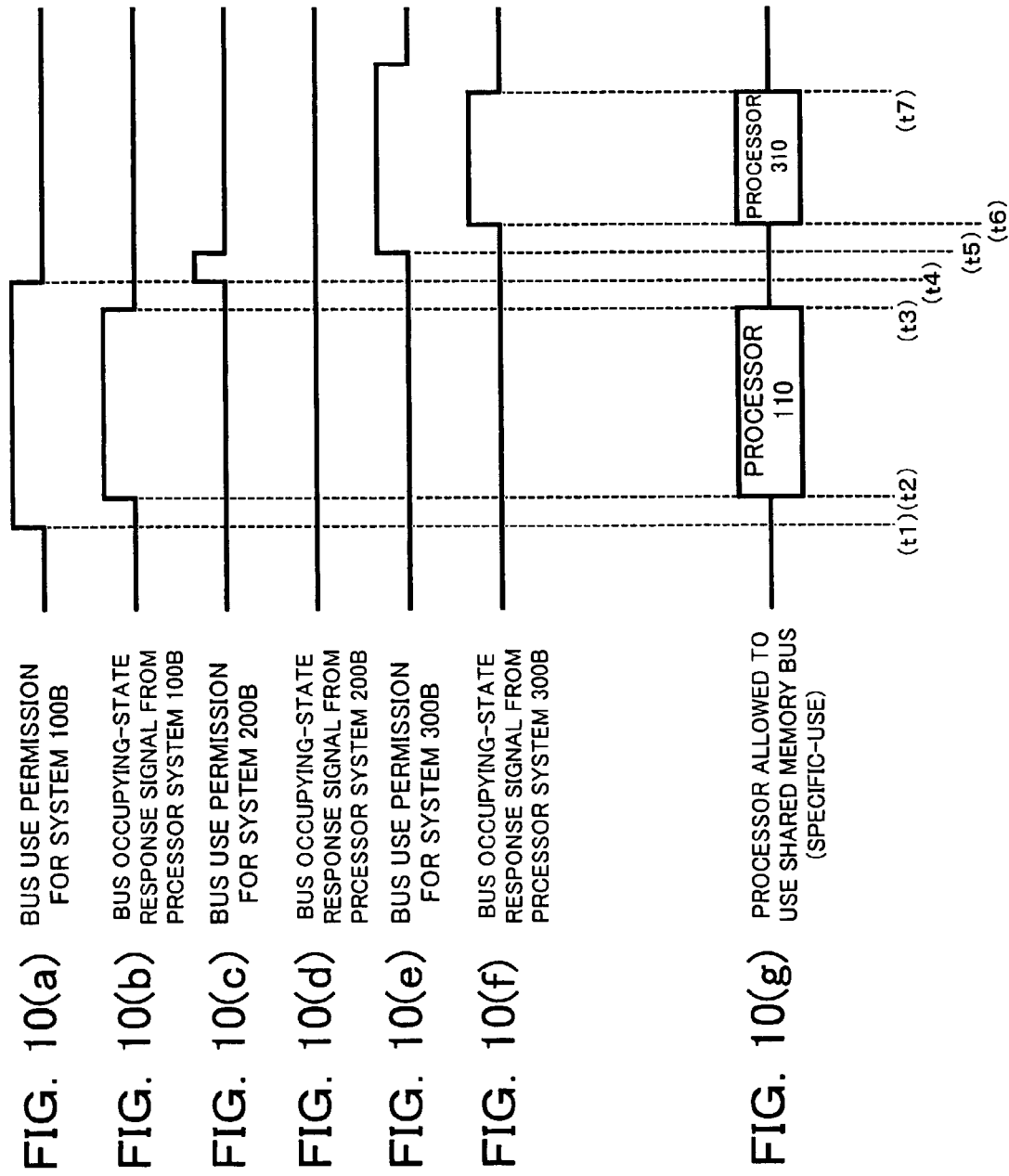
FIG. 10 is a set of timing charts for explaining an operation of the polling control effected in the third embodiment of the present invention.

The above operation will be described in more detail by introducing a concrete example of operation. FIG. 10 is a set of timing charts for explaining an operation of the polling control effected in the third embodiment of the present invention. The bus use-permission notifying unit 512 notifies the processor unit 100B of a bus use permission (timing point t1 of FIG. 10 (*a*)). Thereafter, the bus occupying-state notice monitoring unit 511 receives a bus occupying-state notifying signal (timing point t2 of FIG. 10(*b*)). Thus, the processor unit 100B is allowed to use the specific-use shared memory bus 420 (timing point t2 to t3 of FIG. 10(*g*)).

Subsequently, when the bus occupying-state notice monitoring unit 511 detects the invalidation of the bus occupying-state notifying signal (timing point t3 of FIG. 10(*b*)), then the bus occupying-state notice monitoring unit 511 notifies the bus use-permission notifying unit 512 of a bus use-free state. When the bus use-permission notifying unit 512 receives the bus use-free-state notice, then the bus use-permission notifying unit 512 notifies the processor unit 200B requesting the bus use right of the specific-use shared memory bus 420 of a bus use permission (timing point t4 of FIG. 10(*c*)).

In this example of operation, the processor unit 200B generates no bus occupying-state notice for a predetermined period of time (timing point t4 to t5 of FIG. 10(*d*)). Consequently, the bus occupying-state notice monitoring unit 511 supplies a bus use-free-state notice to the bus use-permission notifying unit 512. Subsequently, the bus use-permission notifying unit 512 supplies a bus use permission notice to the processor unit 300B which is to be given the bus use right of the specific-use shared memory bus 420 (timing point t5 of FIG. 10(*e*)).

Thus, the processor unit 300B generates a bus occupying-state notice signal (timing point t6 to t7 of FIG. 10(*f*)) and is allowed to use the specific-use shared memory bus 420 (timing point t6 to t7 of FIG. 10(*g*)).

As described above, according to the arrangement of the multiprocessor apparatus 30 of the third embodiment of the present invention, for example, the processor 110 of the processor unit 100B can effect classification on the data as a target of access so that data utilized in a real time fashion at a relatively high frequency and data utilized in a real time fashion at a relatively low frequency are distinguished from each other. Moreover, the classified data are classified and handled separately on a hardware base, whereby the reading access request and the writing access request for the data are controlled in accordance with the classification. The following detail description will be made mainly on the processor unit 100B but operation on the processor units 200B and 300B is fundamentally similar to that of the processor unit 100B.

When the common-use/specific-use determining unit 170 of the local memory unit 160 receives an access request from the processor 110, the common-use/specific-use determining unit 170 determines whether the real time property of data transaction among the processor units 100B, 200B, 300B is high or low, based on the address region or the flag adding condition or the like, for example.

In the common-use/specific-use determining unit 170, if it is determined that data commonly utilized in a real time fashion at a relatively low frequency is a target of writing access, the data is written in the specific-use copy memory 148, and the common-use/specific-use determining unit 170 accesses the specific-use shared memory 620 by way of the third buffer 147 and the specific-use shared memory bus 420.

Meanwhile, if data reading is requested on the data stored in the specific-use shared memory 620, the data written in the specific-use copy memory 148 is read and outputted so as to respond to the above request. Thus, the specific-use shared memory 620 need not be accessed.

As described above, when data is accessed, the data commonly utilized in a real time fashion at relatively low frequency can be separately handled from the case where the data commonly utilized in a real time fashion at relatively high frequency is accessed. Accordingly, it becomes possible to suppress the chance of access to the shared memory requiring considerably a lot of time, with the result that processing time spent by the processors can be prevented from being increased.

In the common-use/specific-use determining unit 170, if it is determined that data commonly utilized in a real time fashion at a relatively high frequency is a target of writing access, similarly to the aforesaid first embodiment, data is written in the conflict-use shared memory 610 through the conflict-use shared memory bus 410. Also, the copy circuit 150 controls the copy memory 144 so that the contents of the copy memory 144 is updated. Accordingly, when it is determined that data commonly utilized in a real time fashion at a relatively high frequency is a target of writing access, the requested data can be delivered by only accessing the copy memory 144, which fact makes it unnecessary to access the conflict-use shared memory 610 through the conflict-use shared memory bus 410.

As described above, according to the arrangement of the multiprocessor apparatus 30 of the third embodiment of the present invention, similarly to the arrangement of the aforesaid first arrangement, the whole data of the conflict-use shared memory 610 are copied on the copy memory which is placed under control of each processor 110, 210, 310. Therefore, transaction deriving from the read access can be prevented from being brought about in the conflict-use shared memory bus 410. Accordingly, conflict in the shared memory bus 400 (conflict control) can be suppressed to the minimum level, and access waiting time due to bus conflict can be shortened. Moreover, according to the arrangement of the multiprocessor apparatus 30 of the third embodiment of the present invention, the shared memory bus is composed of the conflict-use shared memory bus 410 and the specific-use shared memory bus 420, and the shared memory is composed of the specific-use shared memory 610 and the specific-use shared memory 620. Therefore, the data commonly utilized in a real time fashion at relatively low frequency can be accessed by way of a bus which is separate from a bus utilized upon accessing the data commonly utilized in a real time fashion at relatively high frequency. In particular, when the data processing is carried out in a real time fashion, access waiting time due to bus conflict can be shortened.

While in the above-described third embodiment data transfer through the specific-use shared memory bus 420 is controlled by means of polling control effected by the polling control circuit 510, the present invention is not limited to this manner of control but data transfer through the bus may be controlled by means of another known scheme.

Although the above-described third embodiment does not employ the status memory and the first buffer of the aforesaid second embodiment, the multiprocessor apparatus of the third embodiment may be arranged to have a functions of the status memory and the first buffer of the aforesaid second embodiment.

[D] Description of Fourth Embodiment

Figure 11:
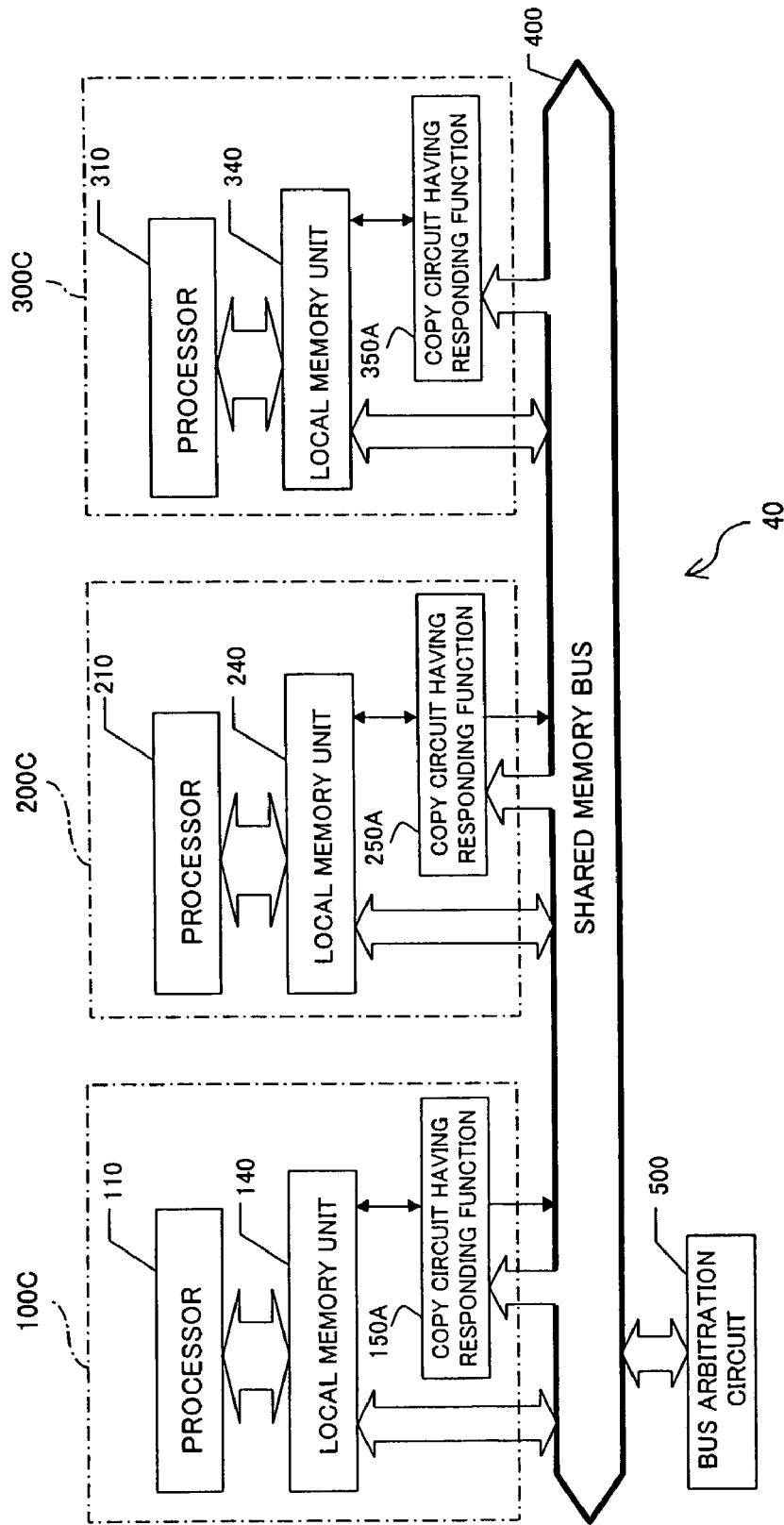
FIG. 11 is a block diagram showing an arrangement of a multiprocessor apparatus as a fourth embodiment of the present invention.

FIG. 11 is a block diagram showing an arrangement of a multiprocessor apparatus as a fourth embodiment of the present invention. As shown in FIG. 11, a multiprocessor apparatus 40 has an arrangement different from the arrangement of the aforesaid first embodiment in the following points. That is, each of copy circuits 150A, 250A, 350A provided in processor units 100C, 200C, 300C, respectively, has an arrangement different from that of the first embodiment. Further, the multiprocessor apparatus 40 as the fourth embodiment does not have the shared memory 600 which is provided in the multiprocessor apparatus 10 as the first embodiment.

Conversely, the multiprocessor apparatus 40 as the fourth embodiment shown in FIG. 11 has a common arrangement to the multiprocessor apparatus 10 as the first embodiment. That is, the multiprocessor apparatus 40 is arranged to include three processor units 100C, 200C, 300C which are capable of executing application processing independently, and the shared memory bus 400 establishing interconnection between the processor units 100C, 200C, 300C and the bus arbitration circuit 500.

Further, similarly to the aforesaid first embodiment, each of the processor units 100C, 200C, 300C has a processor 110, 210, 310 for carrying out command executing processing for the application processing and the local memory unit 140, 240, 340 for storing therein data utilized for the application processing in the respective processors. Further, each of the processor units 100C, 200C, 300C has the copy circuit 150A, 250A, 350A having an arrangement different from that of the aforesaid first embodiment.

Each of the local memory units 140, 240, 340 is arranged to include the first buffer, the memory access arbitration circuit, the copy memory and the second buffer, which are fundamentally the same as those of the first embodiment (see reference numerals 141 to 144 in FIG. 2).

Figure 12:
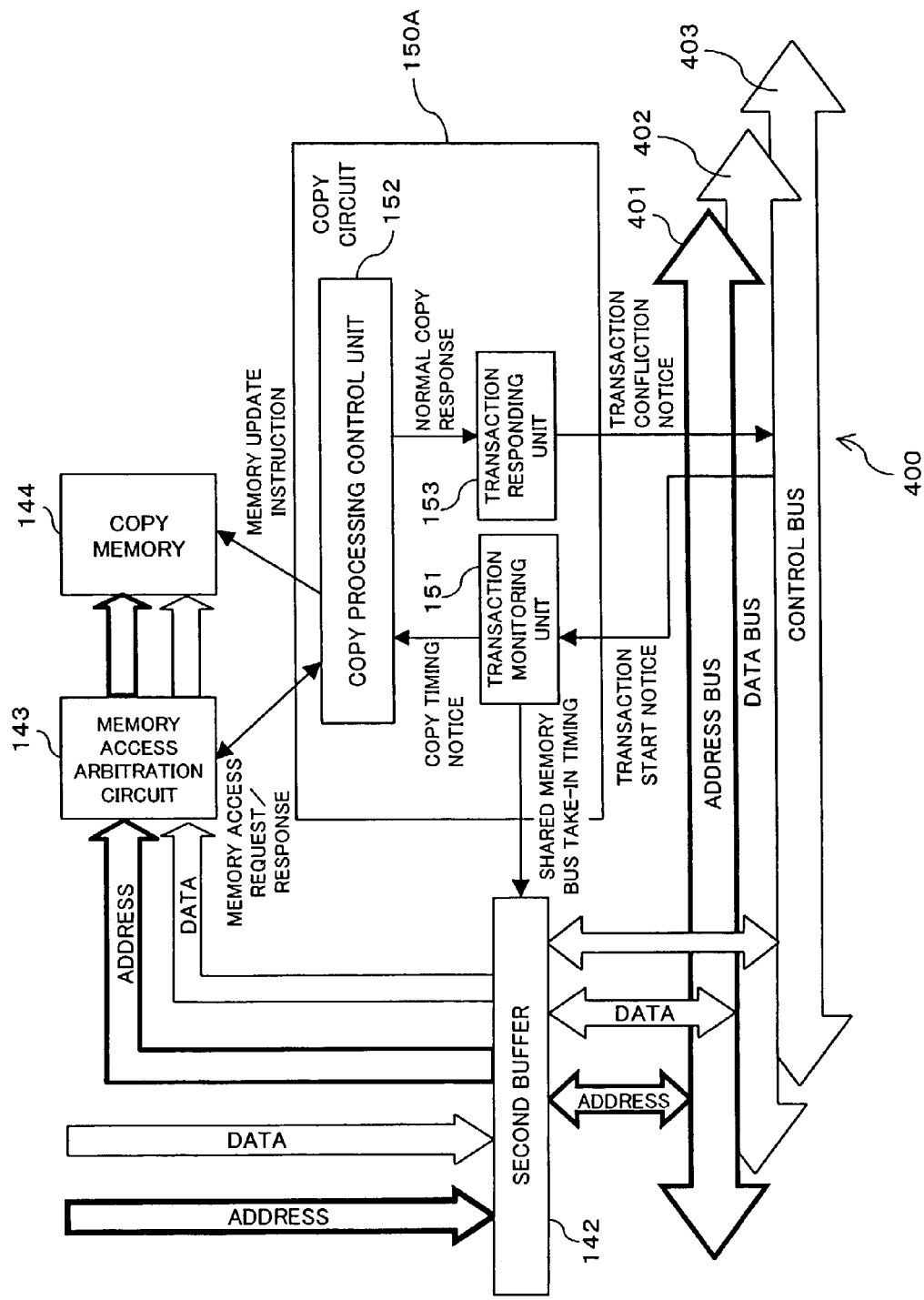
FIG. 12 is a block diagram showing an arrangement including a copy circuit and neighboring components employed in the fourth embodiment of the present invention.

FIG. 12 is a block diagram showing an arrangement including a copy circuit and neighboring components employed in the fourth embodiment of the present invention. Now, the second buffer 142 provided in the local memory unit 140 will be described with reference to FIG. 12. Similarly to the arrangement of the first embodiment, the second buffer 142 is supplied with addresses and data (write data) as a target of update request on the copy memory 144 designated by the processor 110 and temporality stores therein. Also, the second buffer 142 is supplied with contents (write data and address) updated in the copy memory of other processors 200C, 300C through the shared memory bus 400 and temporality stores therein. The addresses and data stored in the second buffer 142 are written in the copy memory 144 in accordance with the copy circuit 150A which will be described later on.

The second buffer 142 has a function such that when the second buffer 142 is supplied with addresses and data as a target of update request to be effected on the copy memory 144 and holds therein, then the second buffer 142 generates a use request of the shared memory bus 400 to the bus arbitration circuit 500 through the control bus 403.

The bus arbitration circuit 500 is a circuit for effect arbitration on the use of the shared memory bus 400. For example, as described above, when the bus arbitration circuit 500 receives the use request of the shared memory bus 400 from the second buffer of the respective local memory unit, the bus arbitration circuit 500 supplies a bus use permission notice to the second buffer 142 through the control bus 403. Further, when the bus arbitration circuit 500 receives a transaction completion notice from the copy circuits 150A, 250A, 350A which will be more fully described later on, the bus arbitration circuit 500 provides a transaction start instruction regarding the next bus use request of the shared memory bus 400.

The copy circuit 150A, 250A, 350A is a circuit for controlling the update processing of its own local memory unit when contents of any of the local memory units 140, 240, 340 of the respective three processor units 100C, 200C, 300C are updated. The copy circuit 150A, 250A, 350A is arranged to include a transaction monitoring unit, a copy processing control unit as an update control unit and a transaction responding unit.

The processor units 200C and 300C have fundamentally the same arrangement as that of the processor unit 100C. Therefore, the following description on the processor unit is made mainly on the arrangement of the processor unit 100C.

As shown in FIG. 12, the copy circuit 150A is arranged to include the transaction monitoring unit 151, the copy processing control unit 152 and the transaction responding unit 153.

The transaction monitoring unit 151 is a unit for monitoring transaction effected on the shared memory bus 400. In more concretely, the transaction monitoring unit 151 is arranged to detect a transaction start notice generated from the second buffer of any of the local memory units 140, 240, 340, which will be described later on.

Further, if a timing is confirmed that the second buffer 142 of its own is allowed to take in the address and data on the shared memory bus 400 after the aforesaid transaction start notice is received, the transaction monitoring unit 151 notifies the second buffer 142 of the timing for taking in the data on the shared memory bus, and also notifies the copy processing control unit 152 of a timing for starting the copy processing.

In this way, the second buffer 142 of its own processor unit can import the address and data as a target of update operation from the shared memory bus 400.

The copy processing control unit 152 is a unit for controlling the update access of the local memory unit 140 in accordance with the result of monitoring of the transaction monitoring unit 151. In more concretely, when the copy processing control unit 152 receives a notice indicative of a copy processing start timing from the transaction monitoring unit 151, the copy processing control unit 152 requests a permission of memory access from the memory access arbitration circuit 143. When the copy processing control unit 152 receives an access permission response from the memory access arbitration circuit 143, the copy processing control unit 152 provides to the copy memory 144 an instruction that the memory update shall be effected in accordance with the address and data held in the second buffer 142.

If the copy processing control unit 152 confirms that the aforesaid copy processing has been completed in the copy memory 144, then the copy processing control unit 152 outputs a normal copy response to the transaction responding unit 153.

The transaction responding unit (transaction completion notifying unit) 153 is a unit for notifying the bus arbitration circuit 500 of the transaction completion through the shared memory bus 400 when the write access of the copy processing control unit 152, i.e., the copy processing of data in the second buffer 142 has been completed.

As described above, according to the arrangement of the multiprocessor apparatus 40 as the fourth embodiment of the present invention, contents of the copy memories of the respective local memory units 140, 240, 340 are updated under control of the copy circuits 150A, 250A, 350A so that data contents coincidence is always maintained. Therefore, the multiprocessor apparatus 40 as the fourth embodiment can operate without the shared memory 600 which is provided in the arrangement of the first embodiment. In other words, the copy memories of the respective local memory units 140, 240, 340 can serve as a virtual shared memory.

Now, description will be made on how the copy memories of the respective local memory units 140, 240, 340 serve as a virtual shared memory. Initially, when the operation of the microprocessor apparatus is started, in order to maintain the coincidence of the data stored in the copy memories of the respective local memory units 140, 240, 340, data writing operation is effected over the whole regions of the respective copy memories serving as the virtual shared memory under the bus arbitration of the bus arbitration circuit 500.

Subsequently, for example, if the processor 110 of the processor unit 100C makes a write access to the local memory unit 140, the operation brought about will be as follows.

When the processor 110 makes write access to the local memory unit 140, the second buffer 142 of the local memory unit 140 requests a bus use right from the bus arbitration circuit 500 while the address and data outputted from the processor 110 are temporarily stored therein. When the bus arbitration circuit 500 provides the bus use right to the processor unit 100C, the second buffer 142 sends the address and data as a target of the write access to the shared memory bus 400.

The transaction monitoring unit 151 of the copy circuit 150A of the processor unit 100C monitors whether or not there is the aforesaid notice indicating that the second buffer 142 sends the address and data to the shared memory bus 400 (whether the second buffer 142 sends a transaction start notice or not). The transaction monitoring unit 151 detects a timing during which the copy memory 144 is allowed to normally import the address and data based on the transaction start notice. If the transaction monitoring unit 151 succeeds in finding the timing, the transaction monitoring unit 151 notifies the copy processing control unit 152 of the timing as a copy timing.

Similarly to the aforesaid first embodiment, the copy processing control unit 152 controls the memory access arbitration circuit 143 and the copy memory 144 based on the copy timing, whereby the address and data stored in the second buffer 142 are written in the copy memory 144 as described above.

If the address and data designated on the shared memory bus 400 are written in the copy memory 144, the copy processing control circuit 152 sends to the transaction responding unit 153 a notice indicating that the data writing has been completed, as a normal copy response. When the transaction responding unit 153 receives the normal copy response, the transaction responding unit 153 supplies to the bus arbitration circuit 500 through the control bus 403 a notice indicating that the transaction has been completed as a transaction completion response.

When the bus arbitration circuit 500 receives the transaction completion response, the bus arbitration circuit 500 can respond to the next bus use request by providing a bus use right.

Now, description will hereinafter be made on how other processor than the processor unit 100C, e.g., the processor unit 200C makes a write access to the local memory unit 240 and the coincidence of the contents of the local memory unit 140 in the processor unit 100C is maintained.

When the processor 210 makes a write access to the local memory unit 240, the second buffer of the local memory unit 240 requests a bus use right from the bus arbitration circuit 500 while the address and data outputted from the processor 210 are temporarily stored therein. When the bus arbitration circuit 500 provides the bus use right to the processor unit 200C, the second buffer of the local memory unit 240 sends the address and data as a target of the write access to the shared memory bus 400.

The transaction monitoring unit 151 of the copy circuit 150A of the processor unit 100C monitors whether or not there is the aforesaid notice indicating that the second buffer of the local memory unit 240 sends the address and data to the shared memory bus 400 (whether the second buffer sends a transaction start notice or not).

The transaction monitoring unit 151 detects a timing during which the second buffer 142 is allowed to normally import the address and data through the shared memory bus 400 based on the transaction start notice. If the transaction monitoring unit 151 succeeds in finding the timing, the transaction monitoring unit 151 notifies the copy processing control unit 152 of the timing as a shared memory bus data import timing. In this way, the second buffer 142 can import the address and data updated by other processor, e.g., the processor unit 200C, into its own second buffer 142.

The transaction monitoring unit 151 monitors the transaction to detect a timing during which the address and data successfully imported into the second buffer 142 are allowed to be copied on the copy memory 144, together with the shared memory bus data import timing. A notice indicative of the time period during which the address and data successfully imported into the second buffer 142 are allowed to be copied on the copy memory 144 is sent to the copy processing control unit 152 as a copy timing.

Similarly to the aforesaid first embodiment, the copy processing control unit 152 controls the memory access arbitration circuit 143 and the copy memory 144 based on the copy timing, whereby the address and data stored in the second buffer 142 are written in the copy memory 144 as described above.

If the address and data designated on the shared memory bus 400 are written in the copy memory 144, the copy processing control circuit 152 sends to the transaction responding unit 153 a notice indicating that the data writing has been completed, as a normal copy response. When the transaction responding unit 153 receives the normal copy response, the transaction responding unit 153 supplies to the bus arbitration circuit 500 through the control bus 403 a notice indicating that the transaction has been completed as a transaction completion notice.

When the bus arbitration circuit 500 receives the transaction completion response, the bus arbitration circuit 500 can respond to the next bus use request by providing a bus use right.

In other words, if any of the local memory units 140, 240, 340 receives a data update request from either of the processors 110, 210, 310, then the local memory units 140, 240, 340 generates a bus use request to the bus arbitration circuit 500. Further, if each of the copy circuit 150A, 250A, 350A receives a bus use permission from the bus arbitration circuit 500 as a result of transaction monitoring on the shared memory bus 400 effected by the transaction monitoring unit, then the copy processing control unit controls the update processing to be carried out in the local memory unit 140, 240, 340 in accordance with the contents of the data update request.

Thus, when the local memory unit 140, 240, 340 receives the data update request from any of the processors 110, 210, 310, the local memory unit 140, 240, 340 generates a bus use request to the bus arbitration circuit 500, while if the copy circuit 150A, 250A, 350A receives the bus use permission from the bus arbitration circuit 500, the copy circuit 150A, 250A, 350A controls the update processing to be carried out in the local memory unit 140, 240, 340 in accordance with the contents of the data update request.

While the above description has been made on a case in which the processor 110 of the processor unit 100C makes a write access to the local memory unit 140, the following description will be made on a case in which the processor 110 of the processor unit 100C makes a read access to the local memory unit 140 as a virtual shared memory.

That is, when the processor 110 makes a read access to the local memory unit 140 as a virtual shared memory, the local memory unit 140 responds to the processor 110 with data of corresponding address.

As described above, according to the arrangement of the multiprocessor apparatus 40 of the fourth embodiment of the present invention, similarly to the aforesaid first embodiment, data to be memorized in the shared memory can be always prepared in each of the local memory unit which is placed under control of the corresponding one of the processors 110, 210, 310. Therefore, it becomes possible to obviate the transaction deriving from the read access on the shared memory bus 400, with the result that conflict of the shared memory bus 400 (conflict control) can be suppressed to the minimum, and waiting time of access due to the bus conflict can be shortened.

Moreover, since the multiprocessor apparatus 40 of the fourth embodiment is arranged to include the copy circuit 150A, 250A, 350A, each of the local memory units 140, 240, 340 can be operated as a virtual shared memory. Therefore, each local memory unit can be operated as a virtual shared memory. accordingly, although the multiprocessor apparatus 40 of the fourth embodiment has no shared memory, it can function equivalently to the multiprocessor apparatus equipped with the shared memory 600 of the first embodiment.

While the above description of the fourth embodiment is made on an arrangement which simply has the feature of the fourth embodiment, i.e., an arrangement functioning as a multiprocessor apparatus without the shared memory, the arrangement of the fourth embodiment may additionally include a function equivalent to the status memory or the first buffer of the aforesaid second embodiment. Alternatively, the arrangement of the fourth embodiment may additionally include an arrangement which is a characteristic feature of the third embodiment, i. e., the shared memory bus composed of a conflict-use one and a specific-use one separately provided and the two-way local memory unit. Furthermore, it is needless to say that the arrangement of the fourth embodiment may additionally include any proper combination of the features of the second and third embodiments.

[E] Other Disclosure

While in the processor apparatus of respective embodiments the number of processors connected to one another through the shared memory bus is three, the arrangement of the present invention is not limited to that described above but any number may be possible so long as the number is plural.

Further, while the processor apparatus of respective embodiments are arranged to include the bus arbitration circuit 500, the present invention is not limited to such an arrangement but an arrangement having no bus arbitration circuit is also involved in the gist of the present invention.

What is claimed is:

1. A multiprocessor apparatus having a plurality of processor units capable of executing an application processing independently, a shared memory for storing therein data commonly utilized by each processor unit upon executing the application processing, and a bus for interconnecting the plurality of processor units and the shared memory, each processor unit comprising:

a processor for carrying out a command executing processing for the application processing;

a local memory unit provided between the processor and the bus and utilized for storing therein a copy of the whole data of the shared memory; and a copy circuit for controlling the local memory unit, when the contents of the shared memory are updated by any other processor unit, so as to update the local memory with the same contents as the shared memory, wherein when the processor requests a piece of data that shall be stored in the shared memory with a data reading command, then the local memory unit responds to the reading command to read the corresponding piece of data from the copied data stored in the local memory unit and supplies the piece of data to the processor, and wherein the local memory unit provided in each processor unit comprising:

a copy memory having a set of regions for storing therein a copy of all data pieces constituting the whole data of the shared memory;

a first buffer for temporarily holding therein address information delivered from the processor for executing the reading command and the resulting read data;

a second buffer for temporarily holding therein an address and data as a target of update request delivered from the processor to the shared memory, and contents of the shared memory updated by any processor of the plurality of processor units supplied through the bus; and a memory access arbitration circuit arranged to respond to the control of the copy circuit so as to effect arbitration on the reading access to the copy memory based on the reading command delivered from the processor and update access for updating the contents of the copy memory in accordance with the contents held in the second buffer.

2. A multiprocessor apparatus according to claim 1, wherein the copy circuit is arranged so that when the processor generates an update command to the shared memory for updating the data stored in the shared memory and the shared memory responds to the update command with an update completion response, then the copy circuit controls the update processing of the local memory unit in accordance with the update contents of the shared memory.

3. A multiprocessor apparatus according to claim 1, wherein the copy circuit comprises a transaction monitoring unit for monitoring the transaction effected through the bus and an update control unit for controlling the update processing effected on the local memory unit based on the monitoring result of the transaction monitoring unit.

4. A multiprocessor apparatus according to claim 3, wherein during the monitoring of the transaction effected through the bus, if the transaction monitoring unit receives an update completion response indicating that the data is updated in the shared memory in response to the update command deriving from the processor, then the update control unit controls the update processing of the local memory unit in accordance with the update contents of the shared memory.

5. A multiprocessor apparatus according to claim 1, wherein the local memory unit comprises a status memory having pieces of information recorded therein so that the pieces of information correspond to all the data pieces stored in the corresponding address regions of the copy memory, respectively, and each piece of information indicates whether the corresponding data piece is updated, and the first buffer comprises a status determining unit for determining the information recorded in the status memory when data corresponding to the address of the reading command from the processor is read from the copy memory, and a reading processing unit arranged to respond to the result of determination delivered from the status determining unit in such a manner that when it is determined that data held at the address corresponding to the reading command is updated, the held data is supplied to the processor while when it is determined that data requested based on the reading command is not updated, the data requested based on the reading command is read from the shared memory and supplied to the processor.

6. A multiprocessor apparatus according to claim 5, wherein if the update access for updating the contents of the copy memory in accordance with the contents held in the second buffer is not satisfactorily carried out, then the status memory is made to have recorded information indicative of data absent status at the corresponding address region.

7. A multiprocessor apparatus having a plurality of processor units capable of executing an application processing independently, a shared memory for storing therein data commonly utilized by each processor unit upon executing the application processing, and a bus for interconnecting the plurality of processor units and the shared memory, each processor unit comprising:

a processor for carrying out a command executing processing for the application processing;

a local memory unit provided between the processor and the bus and utilized for storing therein a copy of the whole data of the shared memory; and a copy circuit for controlling the local memory unit, when the contents of the shared memory are updated by any other processor unit, so as to update the local memory with the same contents as the shared memory, wherein when the processor requests a piece of data that shall be stored in the shared memory with a data reading command, then the local memory unit responds to the reading command to read the corresponding piece of data from the copied data stored in the local memory unit and supplies the piece of data to the processor, and wherein the shared memory comprises a first shared memory unit and a second shared memory unit for storing therein data which is utilized when the plurality of processor units execute application processing in a real time manner, the first shared memory unit being utilized for storing therein data which is utilized at relatively high frequency and a second shared memory unit being utilized for storing therein data which is utilized at relatively low frequency, the bus comprises a first bus for interconnecting the plurality of processor units and the first shared memory unit to each other and a second bus for interconnecting the plurality of processor units and the second shared memory unit to each other.

a first bus arbitration circuit for effecting arbitration on the first bus utilized by the processor unit and a second bus utilization managing circuit for managing the second bus utilization by the processor unit are provided, the local memory unit of each processor unit comprises a classifying unit for classifying data as targets of a reading command or an updating command from the processor into data pieces in accordance with the frequency at which each data piece is utilized, a first local memory unit for storing therein the copied data of the whole contents of the first shared memory unit, and a second local memory unit for storing therein the copied data of the whole contents of the second shared memory unit, the copy circuit is arranged to control the first local memory unit in the update processing when any of the plurality of processors updates the contents of the first shared memory unit, and when the processor requests a piece of data that shall be stored in the shared memory with a data reading command, then the local memory unit responds to the reading command to read the corresponding piece of data from the copied data stored in the local memory unit and supplies the piece of data to the processor.

8. A multiprocessor apparatus having a plurality of processor units capable of executing an application processing independently, and a bus for interconnecting the plurality of processor units to one another, each of the processor units comprising:

a processor for carrying out data reading, data writing and a command executing processing for the application processing;

a local memory unit for storing therein data utilized by the processor for carrying out the application processing; and a copy circuit for controlling the local memory unit provided in its own processor unit, when the contents of local memory unit are updated, so as to update the local memory in its own processor unit with the updated contents of the other local memory, wherein the local memory unit provided in each processor unit comprising:

a memory for storing therein data utilized by the processor for carrying out the application processing;

a first buffer for temporarily holding therein address information utilized for executing the reading command delivered from the processor and resulting read data;

a second buffer for temporarily holding therein data and corresponding address as a target of the data writing request delivered from the processor, and the contents of the memory of the local memory unit updated by any processor of the plurality of processor units; and a memory access arbitration circuit arranged to respond to the control of the copy circuit so as to effect arbitration on the reading access to the memory based on the reading command delivered from the processor and a writing access for writing the contents held in the second buffer into the memory.

9. A multiprocessor apparatus according to claim 8, comprising a bus arbitration circuit for effecting arbitration on a bus use by the processors, wherein when the local memory unit receives a data update request from the processor, the local memory unit outputs a bus use request to the bus arbitration circuit, and when the copy circuit receives a bus use permission from the bus arbitration circuit, the copy circuit controls the local memory unit in the update processing in accordance with the contents of the data update request.

10. The multiprocessor apparatus according to claim 8, comprising a bus arbitration circuit for effecting arbitration on a bus use by the processors, wherein the copy circuit comprises a transaction monitoring unit for monitoring the transaction effected through the bus, an update control unit for controlling the update processing effected on the local memory unit based on the monitoring result of the transaction monitoring unit, and a transaction completion notifying unit for notifying the bus arbitration circuit of the transaction completion through the bus when the writing access by the update control unit is completed.

11. A multiprocessor apparatus according to claim 10, wherein when the local memory unit receives a data update request from the processor, the local memory unit outputs a bus use request to the bus arbitration circuit, and when the bus arbitration circuit generates a bus use permission in accordance with the result of monitoring by the transaction monitoring unit in the copy circuit on the bus transaction, the update control unit controls the local memory unit in the update processing in accordance with the contents of the data update request.

12. A multiprocessor apparatus according to claim 8, wherein the local memory unit comprises a status memory having recorded information indicative of whether the stored data is updated in correspondence with an address region of the local memory where an update control is effected by an update control unit, and the first buffer comprises a status determining unit for reading data from the memory corresponding to an address of the reading command delivered from the processor, temporarily holding the read data, and determining the information recorded in the status memory, and a reading command outputting unit arranged to respond to the result of a determination delivered from a status determining unit in such a manner that when it is determined that data held at the address corresponding to the reading command is updated, the data held is supplied to the processor while when it is determined that data requested based on the reading command is nor updated, then data reading processing is carried out on the local memory unit of another one of the plurality of processor units.

13. A multiprocessor apparatus according to claim 12, wherein if the writing access for writing the contents of the memory in accordance with the contents held in the second buffer is not satisfactorily carried out, then the status memory is made to have recorded information indicative of data absent status at the corresponding address region.

14. A multiprocessor apparatus according to claim 8, wherein the bus comprises a first bus and a second bus for transacting data which is utilized upon executing application processing in a real time manner, the first bus being utilized for transacting data which is utilized at relatively high frequency and a second bus being utilized for transacting data which is utilized at relatively low frequency, the bus arbitration circuit comprises a first bus arbitration circuit for effecting arbitration on the first bus utilized by the processor unit and a second bus utilization managing circuit for effecting arbitration on the second bus utilization by the processor unit, the local memory unit of each processor unit comprises a classifying unit for classifying data as targets of a reading command or an updating command delivered from the processor into data pieces in accordance with the frequency at which each data piece is utilized, a first local memory unit for storing therein data which is used with high frequency, and a second local memory unit for storing therein data which is utilized with low frequency, and the copy circuit is arranged to control the first local memory unit in the update processing when any of the plurality of processors updates the contents of the first shared memory unit.

* * * * *